US011548528B2

(12) United States Patent
Fedorov

(10) Patent No.: US 11,548,528 B2
(45) Date of Patent: Jan. 10, 2023

(54) METHOD OF AND SYSTEM FOR COMPUTING DATA FOR CONTROLLING OPERATION OF SELF DRIVING CAR (SDC)

(71) Applicant: YANDEX SELF DRIVING GROUP LLC, Moscow (RU)

(72) Inventor: Sergey Dmitrievich Fedorov, Saratov (RU)

(73) Assignee: YANDEX SELF DRIVING GROUP LLC, Moscow (RU)

(*) Notice: Subject to any disclaimer, the term of this patent is extended or adjusted under 35 U.S.C. 154(b) by 181 days.

(21) Appl. No.: 17/122,563

(22) Filed: Dec. 15, 2020

(65) Prior Publication Data
US 2021/0197853 A1    Jul. 1, 2021

(30) Foreign Application Priority Data

Dec. 25, 2019  (RU) .......................... RU2019143947

(51) Int. Cl.
  *B60W 60/00*   (2020.01)
  *G01C 21/34*   (2006.01)
  (Continued)

(52) U.S. Cl.
  CPC ....... *B60W 60/001* (2020.02); *G01C 21/3461* (2013.01); *G06V 20/58* (2022.01);
  (Continued)

(58) Field of Classification Search
  None
  See application file for complete search history.

(56) References Cited

U.S. PATENT DOCUMENTS

| | | | |
|---|---|---|---|
| 11,281,969 B1* | 3/2022 | Rangapuram | G06V 10/82 |
| 2016/0313133 A1 | 10/2016 | Zeng | |
| 2017/0364083 A1* | 12/2017 | Yang | G01C 21/3407 |
| 2018/0148051 A1* | 5/2018 | Lujan | G05D 1/0214 |
| 2018/0150081 A1* | 5/2018 | Gross | G05D 1/0217 |

(Continued)

FOREIGN PATENT DOCUMENTS

| | | |
|---|---|---|
| DE | 4313568 C1 | 6/1994 |
| DE | 102014213171 A1 | 10/2015 |

(Continued)

OTHER PUBLICATIONS

Chaocheng Li "A model based path planning algorithm for self-driving cars in dynamic environment", Nov. 27, 2015, Chinese Automation Congress (CAC), Wuhan, China, 2015, pp. 1123-1128, doi: 10.1109/CAC.2015.7382666.

(Continued)

*Primary Examiner* — David P. Merlino
(74) *Attorney, Agent, or Firm* — BCF LLP

(57) ABSTRACT

Methods and devices for generating data for controlling a Self-Driving Car (SDC) are disclosed. The method includes: (i) acquiring a predicted object trajectory for an object, (ii) acquiring a set of anchor points along the lane for the SDC, (iii) for each one of the set of anchor points, determining a series of future moments in time when the SDC is potentially located at the respective one of the set of anchor points, thereby generating a matrix structure including future position-time pairs, (iv) for each future position-time pair in the matrix structure, using the predicted object trajectory for determining a distance between a closest object to the SDC as if the SDC is located at the respective future position-time pair, and (v) storing the distance between the closest object to the SDC in association with the respective future position-time pair in the matrix structure.

18 Claims, 10 Drawing Sheets

(51) Int. Cl.
  *G08G 1/0968* (2006.01)
  *G06V 20/58* (2022.01)
  *G06V 20/56* (2022.01)

(52) U.S. Cl.
  CPC ......... *G06V 20/588* (2022.01); *G08G 1/0968* (2013.01); *B60W 2420/403* (2013.01); *B60W 2552/10* (2020.02); *B60W 2552/53* (2020.02); *B60W 2554/4049* (2020.02)

(56) References Cited

U.S. PATENT DOCUMENTS

| | | | |
|---|---|---|---|
| 2019/0049970 A1* | 2/2019 | Djuric | B60W 60/00276 |
| 2019/0217857 A1 | 7/2019 | Sorin et al. | |
| 2019/0243371 A1* | 8/2019 | Nister | G05D 1/0242 |
| 2020/0156632 A1* | 5/2020 | Ding | B60W 30/0956 |
| 2020/0269873 A1* | 8/2020 | Liu | G05D 1/0238 |
| 2022/0324441 A1* | 10/2022 | Gutierrez | B60W 30/0956 |

FOREIGN PATENT DOCUMENTS

| | | |
|---|---|---|
| EP | 3168640 A1 * | 5/2017 |
| RU | 2702850 C1 | 10/2019 |
| WO | 2016024315 A1 | 2/2016 |
| WO | 2019081921 A1 | 5/2019 |
| WO | 19105640 A1 | 6/2019 |

OTHER PUBLICATIONS

Wang, "Study on Lane Change Trajectory Planning Considering of Driver Characteristics," SAE Technical Paper 2018-01-1627, Aug. 7, 2018, https://doi.org/10.4271/2018-01-1627.

European Search Repod dated Mar. 26, 2021 issued in respect of the counterpart European Patent Application No. 20201704.2.

Russian Search Report dated May 24, 2021 issued in respect of the counterpart Russian Patent Application No. RU 2019143947.

* cited by examiner

FIG. 5

|  | $t_1$ | $t_2$ | $t_3$ | $t_4$ | $t_5$ | $t_6$ | $t_7$ | ... |
|---|---|---|---|---|---|---|---|---|
| 411 | 501 | 502 | 503 | 504 | 505 | 506 | 507 | ... |
| 412 | 511 |  | 513 |  |  |  |  | ... |
| 413 | 521 |  |  |  |  | 526 |  | ... |
| 414 | 531 |  |  |  |  |  |  | ... |

METHOD OF AND SYSTEM FOR COMPUTING DATA FOR CONTROLLING OPERATION OF SELF DRIVING CAR (SDC)

CROSS-REFERENCE

The present application claims priority to Russian Patent Application No. 2019143947, entitled "Method of and System for Computing Data for Controlling Operation of Self Driving Car (SDC)", filed Dec. 25, 2019, the entirety of which is incorporated herein by reference.

FIELD OF TECHNOLOGY

The present technology relates to self-driving cars and, specifically, to methods and systems for computing data for controlling operation of self-driving cars.

BACKGROUND

Several computer-based navigation systems that are configured for aiding navigation and/or control of vehicle have been proposed and implemented in the prior art. These systems range from more basic map-aided localization-based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with a collision control system, which systems upon detection of the vehicle (or other obstacles) in front of the moving vehicle, slow down or stop the vehicle.

Some of the more advanced systems provide for a fully autonomous driving of the vehicle without direct control from the operator (i.e. the driver), so-called Self-Driving Cars (SDCs). A given SDC includes computer systems that can cause the SDC to accelerate, brake, stop, change lane and self-park.

One of the technical challenges in implementing the above computer systems is planning an SDC operation when approaching a turn.

SUMMARY

It is an object of the present technology to ameliorate at least some of the inconveniences present in the prior art. Embodiments of the present technology may provide and/or broaden the scope of approaches to methods of achieving the aims and objects of the present technology.

Developers of the present technology have realized that presence of objects travelling in the proximity of the SDC increase the risk of collision with the SDC. Therefore, it is desirable to use various sensor systems of the SDC to collect information regarding motion of dynamic objects and to analyse this data for determining estimated trajectories of these dynamic objects. This may allow taking into account the estimated trajectories of dynamic objects when controlling operation of the SDC so as to reduce the risk of collision between the SDC and one or more dynamic objects in its surroundings.

Hence, it can be said that in at least some embodiments of the present technology, the developers of the present technology have devised methods and devices for using estimated trajectories of dynamic objects with the purpose of reducing risk of collisions between dynamic objects and the SDC. In other words, these methods and devices have been devised to employ estimated trajectories of dynamic objects in a specific way for controlling operation of the SDC when dynamic objects are located in the surroundings of the SDC.

With reference to FIG. 10, there is depicted an electronic device 1000 and a plurality of sensors 1018 of the SDC. The electronic device 1000 may be coupled to the SDC. The electronic device 1000 may comprise one or more "modules" for performing a variety of data processing, namely: a perception module 1016, a reference path module 1004, a trajectory prediction module 1006 (for dynamic objects), a dynamic distance calculation module 1008, a dynamic index database 1010, a dynamic margin checker 1012, a movement planning module 1014 and a trajectory calculation module 1002 (for SDC). It should be noted that each one of the non-exhaustive list of modules recited above may be embodied as one or more computer-implemented procedures that are configured to perform data processing and/or data generation as described herein. Alternatively, a given module can be a physical electronic device. Optionally, several modules (or all modules) can be implemented in a single electronic device.

The plurality of sensors 1018 of the SDC may be configured to acquire information about the surroundings of the SDC, including information about dynamic objects in the surroundings of the SDC. This information may then be transmitted to the perception module 1016 which may be configured to acquire the information, performing at least some data processing, and provide data to other modules of the electronic device 1000.

In some embodiments, the dynamic distance calculation module 1008 may be configured to receive one or more reference paths for the SDC for the current road segment on which the SDC is travelling. For example, the reference path module 1004 may be configured to generate these reference paths and provide them to the dynamic distance calculation module 1008. The reference path module 1004 may generate the one or more reference paths while taking into account a variety of factors, such as for example, a destination location, traffic rules, other traffic information and the like.

In one non-limiting embodiment of the present disclosure, the reference path module 1004 may generate at least one reference path for the current lane in which the SDC is travelling. In other non-limiting embodiments, the reference path module 1004 may generate a reference path for each lane of the road segment on which the SDC is travelling, including the current lane of the SDC.

In some embodiments, the dynamic distance calculation module 1008 may also be configured to receive from the trajectory prediction module 1006 a list of dynamic objects detected in the surroundings of the SDC as well as the respective predicted trajectories. For example, the trajectory prediction module 1006 may be configured to determine the predicted trajectories for the dynamic objects based on movement data about these dynamic objects which is indicative of kinematic characteristics of the dynamic objects and based on road segment data that is indicative of various limitations of the road segment, such as for example, traffic rules, shape and borders of lanes. It should be noted that the predicted trajectories may be associated with a "level of accuracy" since the predicted trajectories are of a probabilistic nature due to the prediction being made based on current movement data of the dynamic objects. Nevertheless, the predicted trajectories may be iteratively updated on the basis of the most current information about the dynamic objects and the road segment gathered by the plurality of sensors 1018.

In some embodiments, the dynamic distance calculation module 1008 may receive data about predicted trajectories of only some dynamic objects, such as dynamic objects which are not travelling in a same lane as the SDC (e.g., dynamic objects travelling in neighboring lanes to the current lane of the SDC).

It should be noted that if a given dynamic object is travelling in a same lane as the SDC, the operation of the SDC may be controlled by triggering braking actions and/or acceleration actions. These actions may be triggered by the movement planning module 1014 of the electronic device 1000.

However, in at least some embodiments, the developers of the present technology have devised methods and devices that provide solutions in situations when dynamic objects present in neighboring lanes pose a risk of collisions with the SDC. In other words, trajectories that fully lays on one or another side from the central line of a base lane path. Such situation may include, for example, a big sized lorry slowly travelling in a neighboring lane and slightly crosses over the lane border of the current lane of the SDC, and/or a bicyclist travelling near the current lane of the SDC. The methods and devices devised by the developers of the present technology may allow altering a current trajectory of the SDC and/or to control operation of the SDC such that in the above situations, the risk of collisions with dynamic objects is reduced.

In some embodiments of the present technology, once the one or more reference paths are acquired from the reference path module 1004 and once one or more detected dynamic objects with their respective predicted trajectories are acquired from the trajectory prediction module 1006, the dynamic distance calculation module 1008 may be configured to determine a "dynamic index" for each one of the one or more reference paths. As it will become apparent from the description herein further below, broadly speaking, the dynamic index may be stored in a form of a matrix structure in a local and/or remote memory of the electronic device 1000.

It should be noted that the one or more dynamic indexes determined by the dynamic distance calculation module 1008 may be used to determine a most risk-averse trajectory for the SDC. For example, the SDC may have a graph-structure representing various SDC states on the road segment. In this example, the one or more dynamic indexes may be used in order to determine a sequence of SDC states on the road segment that reduce the risk of collision with the one or more dynamic objects in the surroundings of the SDC.

It should be noted that the one or more dynamic indexes are determined in real-time, however, are pre-computed for performing the selections of the sequence of the SDC state on the road segment that reduce the risk of collision with the one or more dynamic objects in the surroundings of the SDC. In other words, the one or more dynamic indexes are iteratively updated in real-time for performing the selection of the above sequence of the SDC states on the road segment. It is contemplated that the one or more dynamic indexes may be updated in a recurrent manner and at a pre-determined frequency. In some cases, once the data from the one or more dynamic indexes is to be used by a given module of the electronic device 1000, the electronic device 1000 may be configured to access the most recently updated one or more dynamic indexes.

How the electronic device 1000 may be configured to generate a dynamic index for a respective reference path will now be discussed. To better illustrate this, let it be assumed that one reference path is generated for the SDC in the current lane of the SDC. This reference path may include one or more anchor points that are aligned along the centre line of the current lane of the SDC. As such, this reference path may sometimes be referred as a "default" reference path of the SDC, since, it is assumed that in normal conditions the SDC is ought to travel along the centre line of a given lane by default. Indeed, developers of the present technology have realized that in normal conditions, such as for example when the SDC is travelling along a straight lane, the SDC ought to be travelling along the centre line of that lane for safety purposes.

It is contemplated that the electronic device 1000 (the dynamic distance calculation module 1008) may determine a distance horizon (or a "predication horizon") to be used for the reference path. For example, the distance horizon may be 200 m long—which means that the first 200 m of the reference path are to be taken into account for generation of a respective dynamic index. Also, the distance horizon may include a "sub-step". For example, the distance horizon may further be indicative of a sub-set of 0.25 m—which means that the first 200 m of the reference path are to be split into smaller sections via position points separated by a distance of 0.25 m. It is contemplated that in such a setup, the dynamic index may include information for each 0.25 m of the next 200 m of the reference path of the SDC.

It is contemplated that the distances in between the position points may depend on the current velocity of the SDC—that is, the higher the velocity the smaller the distance in between the position points. Optionally, the distances between the anchor points may be pre-selected or selected in real-time during operation of the SDC. It is contemplated that each position point may correspond to a respective anchor point of the reference path of the SDC.

It is contemplated that the electronic device 1000 (the dynamic distance calculation module 1008) may determine a timeline horizon to be used in combination with the reference path. For example, the timeline horizon may be of 20 s—which means that the next 20 s of the SDC movement along the reference path are to be taken into account for generation of the respective dynamic index. Also, the timeline horizon may include a "sub-step". For example, the timeline horizon may further be indicative of a sub-set of 0.1 s—which means that the next 20 s of the SDC movement along the reference path are to be split into smaller sections via time points separated by 0.1 s. It is contemplated that in such a setup, the dynamic index may include information for each 0.1 s of the next 20 s for the SDC on the reference path. It is contemplated that the time intervals in between the time points may depend on the current velocity of the SDC.

Overall, the electronic device 1000 (the dynamic distance calculation module 1008) may determine that the dynamic index for a given reference path of the SDC should include information (i) for each 0.25 m of the next 200 m of the reference path of the SDC, and (ii) for each 0.1 s of the next 20 s for the SDC on the reference path.

In some embodiments, it is contemplated that once the electronic device 1000 acquires the reference path, the electronic device 1000 (the dynamic distance calculation module 1008) may generate a plurality of position-time pairs along the reference path which represent respective cells of the dynamic index. In the above setup, each position-time pair may correspond to a respective increment of 0.25 m and 0.1 s for the next 200 m and 20 s of the SDC on the reference path.

In some embodiments, once the electronic device 1000 determines the predicted trajectories candidates of the dynamic objects, the dynamic distance calculation module 1008 may be configured to determine information for each position-time pair of the dynamic index. For example, for each position-time pair, the dynamic distance calculation module 1008 may analyze the predicted trajectories of the dynamic objects and determine the following: "if the SDC is located at the respective position point and the respective time point of a given position-time pair along the reference path, is there one or more dynamic objects at that respective time point on the left or right of the SDC, and if so, what is the distance between those dynamic objects and the SDC?". As such, the electronic device 1000 may generate the dynamic index such that a respective cell contains a respective distance to a closest dynamic object on the left and a closest dynamic object on the right of the SDC. In some embodiments, the dynamic index may also contain additional data about such closest dynamic objects, such as their orientation at that time point, for example.

The electronic device 1000 may then store the dynamic index as a matrix structure in the dynamic margin index database 1010. The dynamic margin index database 1010 may be periodically updated by the dynamic distance calculation module 1008. In one embodiment of the present disclosure, due to computing resources limitation, the electronic device 1000 may only pre-calculate the dynamic index for 200 m in front of the SDC (distance horizon). The electronic device 1000 may be triggered to update or generate one or more matrix structure stored in the dynamic margin index database 1010 based on at least one of (i) receiving data about a new dynamic objects, (ii) receiving data about a new reference path, (iii) receiving data about a new predicted trajectory, and (iv) the like.

In some non-limiting embodiments, the dynamic margin checker 1012 may receive a query from the trajectory calculation module 1002. The query from the trajectory calculation module 1002 may contain an indication of reference path for which the data from dynamic index database should be retrieved. The system may be built in a way that the set reference paths contain a reference path for which the trajectory calculation module 1002 requests the dynamic index data.

In one non-limiting embodiment of the present disclosure, the request of the trajectory calculation module 1002 may contain an indication of more than one reference paths. In that case, the dynamic margin checker 1012 may retrieve the dynamic index data from the more than one respective dynamic indexes.

In some non-limiting embodiments, in addition to the indication of a reference path, the request may contain a time coordinate and position coordinate of a potential future location of the SDC. The dynamic margin checker may respond with the distance to the closest left/right dynamic object at the requested time coordinate and position coordinate. If the requested time coordinate and position coordinate do not match the given cell of the dynamic index database, the dynamic margin checker may retrieve the distances to the closest left/right dynamic object(s) at the closest position-time pair to the requested time coordinate and position coordinate.

In some non-limiting embodiments, based on the response of the dynamic margin checker 1012, the trajectory calculation module 1002 may determine a trajectory that reduced the risk of collisions of the SDC with the dynamic objects on the road segment.

In other embodiments of the present disclosure, the trajectory calculation module 1002 may be configured to calculate a set of resulting trajectory candidates associated with the set of reference paths. The resulting trajectory candidates are formed from the base trajectory by shifting the anchor points left and/or right in the lane of a respective reference path. The calculations are performed in a coordinate system associated with the base trajectory of the first reference path.

In some cases, the SDC may be travelling along an initial trajectory of the first reference path in a current lane. The current lane may be blocked by a static object. At the same moment, a truck may be moving in another lane. The inter-vehicular-distances at different position-time pairs between the SDC and the truck may be retrieved from the dynamic index database.

Then the trajectory calculation module 1002 may also be configured to perform an assessment of trajectory candidates. For example, the assessments may be based on safety parameters such as distance to the dynamic objects at different position-time pairs, necessity to change reference paths, and the like. The trajectory calculation module 1002 may then be configured to select a most safe trajectory amongst the trajectory candidates.

It is contemplated that minimal safety distance requirements could be set as fixed parameters or as a function of the velocity of the SDC and of other objects, the size of the SDC and of other objects, and the like. In some embodiments, the movement planning module 1014 may be configured to generate velocity and acceleration profiles for the selected trajectory. The trajectory calculation module 1002 may communicate with the movement planning module 1014 at the same moment or after it receives data from the dynamic margin checker 1012. In some cases, the trajectory calculation module 1002 may request the movement planning module 1004 information about a planned velocity and/or planned acceleration profiles.

In a first broad aspect of the present technology, there is provided a computer-implemented method of generating control data for controlling operation of a Self-Driving Car (SDC). The SDC is travelling on a road segment having a lane. The method is executable by an electronic device coupled with the SDC. The method comprises acquiring, by the electronic device, a predicted object trajectory associated with an object on the road segment. The predicted object trajectory is based on movement data of the object. The method comprises acquiring, by the electronic device, a set of anchor points along the lane. The set of anchor points is representative of a default vehicle path of the SDC along the lane. A given one of the set of anchor points is indicative of a potential future position of the SDC along the default vehicle path. The method comprises, for each one of the set of anchor points, determining, by the electronic device, a series of future moments in time when the SDC is potentially located at the respective future position of the respective one of the set of anchor points, and thereby generating a matrix structure that includes future position-time pairs for the SDC. A given future position-time pair is indicative of when and where the SDC will potentially be located in the future along the default vehicle path. The method comprises, for each future position-time pair in the matrix structure, using, by the electronic device, the predicted object trajectory for determining a distance between a closest object to the SDC as if the SDC is located at the respective future position-time pair. The method comprises, storing, by the electronic device in a memory, the distance between the closest object to the SDC in association with the respective future position-time pair in the matrix structure. The distance stored in the matrix structure for the respective future position-time pair is representative of a safety corridor for the SDC if the SDC is located at the respective future position-time pair.

In some embodiments of the method, the default vehicle path is located along a center line of the lane.

In some embodiments of the method, the method further comprises, during an in-use phase of the matrix structure, acquiring, by the electronic device, SDC state data associated with vertices in a graph-structure. The vertices are connected by edges in the graph-structure. A given vertex defines a respective state of the SDC on the road segment. A given state of the SDC represents at least a respective position of the SDC on the road segment at a respective moment in time. A given edge defines a transition between a respective pair of states of the SDC on the road segment. The method further comprises, during an in-use phase of the matrix structure, using, by the electronic device, the SDC state data of the given vertex for accessing the memory storing the matrix structure. The accessing is for retrieving the distance associated with the future position-time pair that best matches the position and the moment in time of the respective state of the SDC. The method further comprises, during an in-use phase of the matrix structure, using, by the electronic device, the retrieved distance to generate a penalty score for a given edge connected to the given vertex. The penalty score is indicative of how safe a transition from a previous state of the SDC to the respective state of the SDC is.

In some embodiments of the method, the method further comprises, during the in-use phase of the matrix structure, generating, by the electronic device, a respective penalty score for each edge of the graph-structure. The method further comprises, during the in-use phase of the matrix structure, executing, by the electronic device, a shortest-path-type algorithm for determining a series of target states of the SDC that is a most safe series of states on the road segment along the lane. The series of target states of the SDC is connected by a series of target edges. The series of target edges has a smallest cumulative penalty score. The method further comprises, during the in-use phase of the matrix structure, using, by the electronic device, the SDC state data of the series of target states for generating the control data for controlling operation of the SDC. The method further comprises, during the in-use phase of the matrix structure, triggering, by the electronic device, operation of the SDC on the road segment in accordance with the control data.

In some embodiments of the method, the method further comprises acquiring, by the electronic device, a second predicted object trajectory associated with a second object on the road segment. The second predicted object trajectory is based on movement data of the second object on the road segment. The using the predicted object trajectory for each future position-time pair further comprises, for each future position-time pair in the matrix structure, using, by the electronic device, the predicted object trajectory and the second predicted object trajectory for determining a distance between a left-closest object to the SDC and a right-closest object to the SDC as if the SDC is located at the respective future position-time pair. The storing the distance in the memory further comprises storing, by the electronic device in the memory, the distance between the left-closest object to the SDC and the distance between the right-closest object to the SDC in association with the respective future position-time pair in the matrix structure. The distance to the left-closest object and the distance to the right-closest object stored in the matrix structure for the respective future position-time pair are representative of the safety corridor for the SDC if the SDC is located at the respective future position-time pair.

In some embodiments of the method, the road segment has more than one lane. The object and the second object are not travelling along a same lane as the SDC.

In some embodiments of the method, the road segment has more than one lane. The object is travelling in a given lane that is on a left side of the lane in which the SDC is travelling. The second object is travelling in another given lane that is on a right side of the lane in which the SDC is travelling.

In some embodiments of the method, the road segment has a second lane. The method further comprises acquiring, by the electronic device, a second set of anchor points along the second lane. The second set of anchor points is representative of a second default vehicle path of the SDC along the second lane. A given one of the second set of anchor points is indicative of a potential future position of the SDC along the second default vehicle path. The method further comprises, for each one of the second set of anchor points, determining, by the electronic device, a series of future moments in time when the SDC is potentially located at the respective future position of the respective one of the second set of anchor points, and thereby generating a second matrix structure including second future position-time pairs for the SDC. A given second future position-time pair is indicative of when and where the SDC will potentially be located in the future along the second lane. The method further comprises, for each second future position-time pair in the second matrix structure, using, by the electronic device, the predicted object trajectory for determining a distance between a closest object to the SDC as if the SDC is located at the respective second future position-time pair. The method further comprises, storing, by the electronic device in a memory, the distance between the closest object to the SDC in association with the respective second future position-time pair in the second matrix structure. The distance stored in the second matrix structure for the respective second future position-time pair is representative of the safety corridor for the SDC if the SDC is located at the respective second future position-time pair.

In some embodiments of the method, the method further comprises, during an in-use phase of the matrix structure and of the second matrix structure acquiring, by the electronic device, SDC state data associated with vertices in a graph-structure. The vertices is connected by edges in the graph-structure. A given vertex defines a respective state of the SDC on the road segment. A given state of the SDC represents at least a respective position of the SDC on the road segment at a respective moment in time. A given edge defines a transition between a respective pair of states of the SDC on the road segment. The method further comprises, during an in-use phase of the matrix structure and of the second matrix structure, using, by the electronic device, the SDC state data of the given vertex for accessing the memory storing (i) the respective future position-time pairs in the matrix structure, and (ii) the respective second future position-time pairs in the second matrix structure. The accessing is for retrieving the distance associated with one of (i) the future position-time pair and (ii) the second future position-time pair that best matches the position and the moment in time of the respective state of the SDC. The method further comprises, during an in-use phase of the matrix structure and of the second matrix structure, using, by the electronic device, the retrieved distance to generate a penalty score for a given edge connected to the given vertex. The penalty score is indicative of how safe a transition from a previous state of the SDC to the respective state of the SDC is In some embodiments of the method, if the given edge is indicative of a transition of the SDC between two lanes, the method further comprises accessing both the matrix structure and the second matrix structure.

In some embodiments of the method, the first matrix structure and the second matrix structure is based on at least partially different information about a plurality of other objects on the road segment.

In some embodiments of the method, the object is a dynamic object.

In a second broad aspect of the present technology, there is provided a computer-implemented method of generating control data for controlling operation of a Self-Driving Car (SDC). The SDC is travelling on a road segment having a lane. The method is executable by an electronic device coupled with the SDC. The method comprises acquiring, by the electronic device, a predicted object trajectory associated with an object on the road segment. The predicted object trajectory is based on movement data of the object. The method comprises acquiring, by the electronic device, a set of anchor points along the lane on which the SDC is travelling. The set of anchor points being representative of a default vehicle path of the SDC along the lane. A given one of the set of anchor points is indicative of a potential future position of the SDC along the default vehicle path. The method comprises determining, by the electronic device, a series of future moments in time when the SDC is potentially located at the respective future position of the respective one of the set of anchor points. The method comprises generating a matrix structure including a plurality of future position-time pairs for the SDC. A given future position-time pair is indicative of when and where the SDC will potentially be located in the future along the default vehicle path. The method comprises, for each future position-time pair in the matrix structure, using, by the electronic device, the predicted object trajectory for determining a distance between a closest object to the SDC as if the SDC is located at the respective future position-time pair. The method comprises storing, by the electronic device in a memory, the distance between the closest object to the SDC in association with the respective future position-time pair in the matrix structure. The distance stored in the matrix structure for the respective future position-time pair is representative of a safety corridor for the SDC if the SDC is located at the respective future position-time pair.

In a third broad aspect of the present technology, there is provided a computer-implemented method of generating control data for controlling operation of a Self-Driving Car (SDC). The SDC is travelling on a road segment having a lane. The method is executable by an electronic device coupled with the SDC. The method comprises acquiring, by the electronic device, a predicted object trajectory associated with an object on the road segment. The predicted object trajectory is based on movement data of the object on the road segment. The method comprises generating a matrix structure including a plurality of future position-time pairs for the SDC. A given future position-time pair is indicative of when and where the SDC will potentially be located in the future along a default vehicle path. The method comprises, for each future position-time pair in the matrix structure, using, by the electronic device, the predicted object trajectory for determining a distance between a closest object to the SDC as if the SDC is located at the respective future position-time pair. The method comprises storing, by the electronic device in a memory, the distance between the closest object to the SDC in association with the respective future position-time pair in the matrix structure. The distance stored in the matrix structure for the respective future position-time pair is representative of a safety corridor for the SDC if the SDC is located at the respective future position-time pair.

In some embodiments of the present technology, the generating the matrix structure comprises acquiring, by the electronic device, a set of anchor points along the lane on which the SDC is travelling. The set of anchor points is representative of the default vehicle path of the SDC along the lane. A given one of the set of anchor points is indicative of a potential future position of the SDC along the default vehicle path. The generating the matrix structure comprises determining, by the electronic device, a series of future moments in time when the SDC is potentially located at the respective future position of the respective one of the set of anchor points.

In a fourth aspect of the present technology, there is provided an electronic device for generating control data for controlling operation of a Self-Driving Car (SDC). The SDC is travelling on a road segment having a lane. The electronic device is coupled with the SDC. The electronic device is configured to acquire a predicted object trajectory associated with an object on the road segment. The predicted object trajectory is based on movement data of the object. The electronic device is configured to acquire a set of anchor points along the lane. The set of anchor points is representative of a default vehicle path of the SDC along the lane. A given one of the set of anchor points is indicative of a potential future position of the SDC along the default vehicle path. The electronic device is configured to, for each one of the set of anchor points, determine a series of future moments in time when the SDC is potentially located at the respective future position of the respective one of the set of anchor points, and thereby generate a matrix structure including future position-time pairs for the SDC. A given future position-time pair is indicative of when and where the SDC will potentially be located in the future along the default vehicle path. The electronic device is configured to, for each future position-time pair in the matrix structure, use the predicted object trajectory for determining a distance between a closest object to the SDC as if the SDC is located at the respective future position-time pair. The electronic device is configured to store, in a memory, the distance between the closest object to the SDC in association with the respective future position-time pair in the matrix structure. The distance stored in the matrix structure for the respective future position-time pair is representative of a safety corridor for the SDC if the SDC is located at the respective future position-time pair.

In some embodiments of the electronic device, the default vehicle path is located along a center line of the lane.

In some embodiments of the electronic device, the electronic device is further configured to, during an in-use phase of the matrix structure, acquire SDC state data associated with vertices in a graph-structure. The vertices are connected by edges in the graph-structure. A given vertex defines a respective state of the SDC on the road segment. A given state of the SDC represents at least a respective position of the SDC on the road segment at a respective moment in time.

A given edge defines a transition between a respective pair of states of the SDC on the road segment. The electronic device is further configured to, during an in-use phase of the matrix structure, use the SDC state data of the given vertex for accessing the memory storing the matrix structure. The accessing is for retrieving the distance associated with the future position-time pair that best matches the position and the moment in time of the respective state of the SDC. The electronic device is further configured to, during an in-use phase of the matrix structure, use the retrieved distance to generate a penalty score for a given edge connected to the given vertex. The penalty score is indicative of how safe a transition from a previous state of the SDC to the respective state of the SDC is.

In some embodiments of the electronic device, the electronic device is further configured to, during the in-use phase of the matrix structure, generate a respective penalty score for each edge of the graph-structure. The electronic device is further configured to, during the in-use phase of the matrix structure, execute a shortest-path-type algorithm for determining a series of target states of the SDC that is a most safe series of states on the road segment along the lane. The series of target states of the SDC is connected by a series of target edges. The series of target edges has a smallest cumulative penalty score. The electronic device is further configured to, during the in-use phase of the matrix structure, use the SDC state data of the series of target states for generating the control data for controlling operation of the SDC. The electronic device is further configured to, during the in-use phase of the matrix structure, trigger operation of the SDC on the road segment in accordance with the control data.

In some embodiments of the electronic device, the electronic device is further configured to acquire a second predicted object trajectory associated with a second object on the road segment. The second predicted object trajectory is based on movement data of the second object on the road segment. The electronic device configured to use the predicted object trajectory for each future position-time pair further comprises the electronic device configured to, for each future position-time pair in the matrix structure, use the predicted object trajectory and the second predicted object trajectory for determining a distance between a left-closest object to the SDC and a right-closest object to the SDC as if the SDC is located at the respective future position-time pair. The electronic device configured to store the distance in the memory further comprises the electronic device configured to store, in the memory, the distance between the left-closest object to the SDC and the distance between the right-closest object to the SDC in association with the respective future position-time pair in the matrix structure. The distance to the left-closest object and the distance to the right-closest object stored in the matrix structure for the respective future position-time pair are representative of the safety corridor for the SDC if the SDC is located at the respective future position-time pair.

In some embodiments of the electronic device, the road segment has more than one lane. The object and the second object are not travelling along a same lane as the SDC.

In some embodiments of the electronic device, the road segment has more than one lane. The object is travelling in a given lane that is on a left side of the lane in which the SDC is travelling. The second object is travelling in another given lane that is on a right side of the lane in which the SDC is travelling.

In some embodiments of the electronic device, the road segment has a second lane. The electronic device is further configured to acquire a second set of anchor points along the second lane. The second set of anchor points is representative of a second default vehicle path of the SDC along the second lane. A given one of the second set of anchor points is indicative of a potential future position of the SDC along the second default vehicle path. The electronic device is further configured to, for each one of the second set of anchor points, determine a series of future moments in time when the SDC is potentially located at the respective future position of the respective one of the second set of anchor points, and thereby configured to generate a second matrix structure including second future position-time pairs for the SDC. A given second future position-time pair is indicative of when and where the SDC will potentially be located in the future along the second lane. The electronic device is further configured to, for each second future position-time pair in the second matrix structure, use the predicted object trajectory for determining a distance between a closest object to the SDC as if the SDC is located at the respective second future position-time pair. The electronic device is further configured to, store, in a memory, the distance between the closest object to the SDC in association with the respective second future position-time pair in the second matrix structure. The distance stored in the second matrix structure for the respective second future position-time pair is representative of the safety corridor for the SDC if the SDC is located at the respective second future position-time pair.

In some embodiments of the electronic device, the electronic device is further configured to, during an in-use phase of the matrix structure and of the second matrix structure, acquire SDC state data associated with vertices in a graph-structure. the vertices are connected by edges in the graph-structure. A given vertex defines a respective state of the SDC on the road segment. A given state of the SDC representing at least a respective position of the SDC on the road segment at a respective moment in time. A given edge defines a transition between a respective pair of states of the SDC on the road segment. The electronic device is further configured to, during an in-use phase of the matrix structure and of the second matrix structure, use the SDC state data of the given vertex for accessing the memory storing (i) the respective future position-time pairs in the matrix structure, and (ii) the respective second future position-time pairs in the second matrix structure. The accessing is for retrieving the distance associated with one of (i) the future position-time pair and (ii) the second future position-time pair that best matches the position and the moment in time of the respective state of the SDC. The electronic device is further configured to, during an in-use phase of the matrix structure and of the second matrix structure, use the retrieved distance to generate a penalty score for a given edge connected to the given vertex. The penalty score is indicative of how safe a transition from a previous state of the SDC to the respective state of the SDC is.

In some embodiments of the electronic device, if the given edge is indicative of a transition of the SDC between two lanes, the electronic device is further configured to access both the matrix structure and the second matrix structure.

In some embodiments of the electronic device, the first matrix structure and the second matrix structure is based on at least partially different information about a plurality of other objects on the road segment.

In some embodiments of the electronic device, the object is a dynamic object.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 5 depicts the matrix structure determined for the first scenario of FIG. 4, in accordance with at least some embodiments of the present technology.

DETAILED DESCRIPTION

Figure 1:
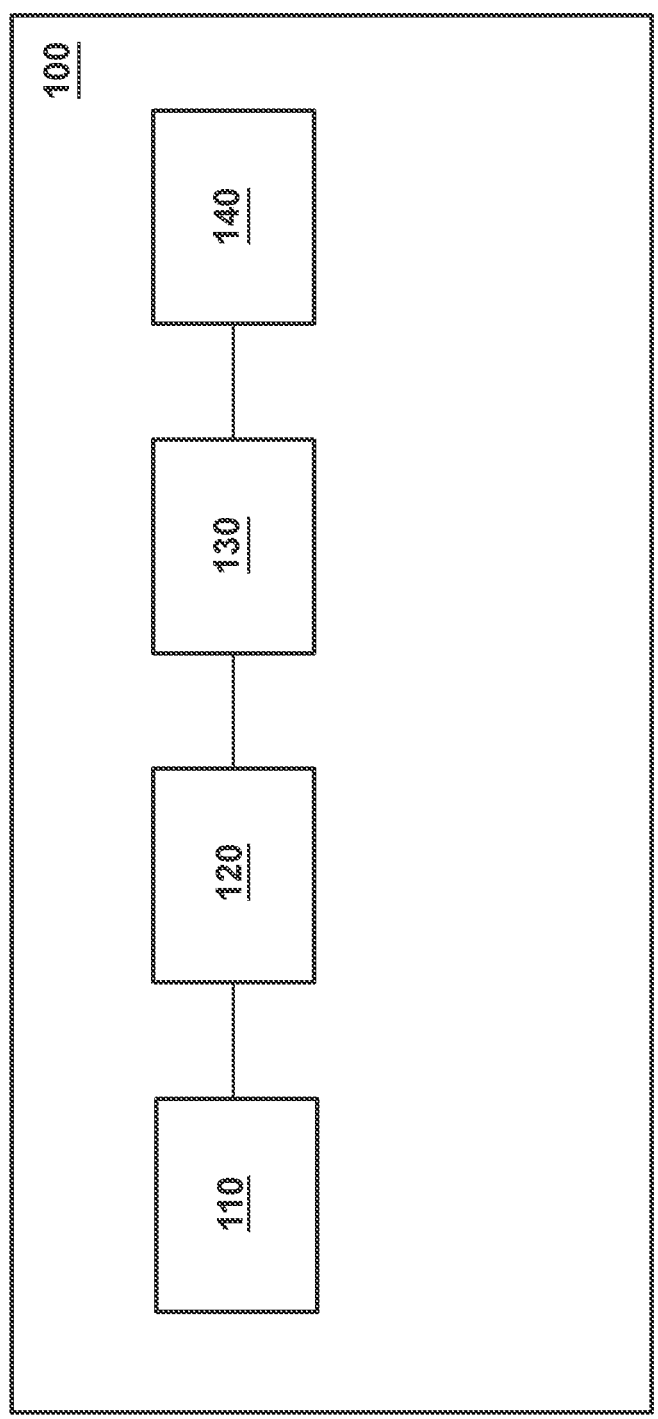
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology.

Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled.

In at least some embodiments of the present technology, the solid-state drive 120 stores program instructions suitable for being loaded into the memory 130 and executed by the processor 110 for determining a presence of an object. For example, the program instructions may be part of a vehicle control application executable by the processor 110.

In at least some embodiments of the present technology, it is contemplated that the computer system 100 may have additional and/or optional components, such as a network communication module 140 for communication, via a communication network (for example, a communication network 240 depicted in FIG. 2) with other electronic devices and/or servers, localization modules (not depicted), and the like.

Networked Computer Environment

Figure 2:
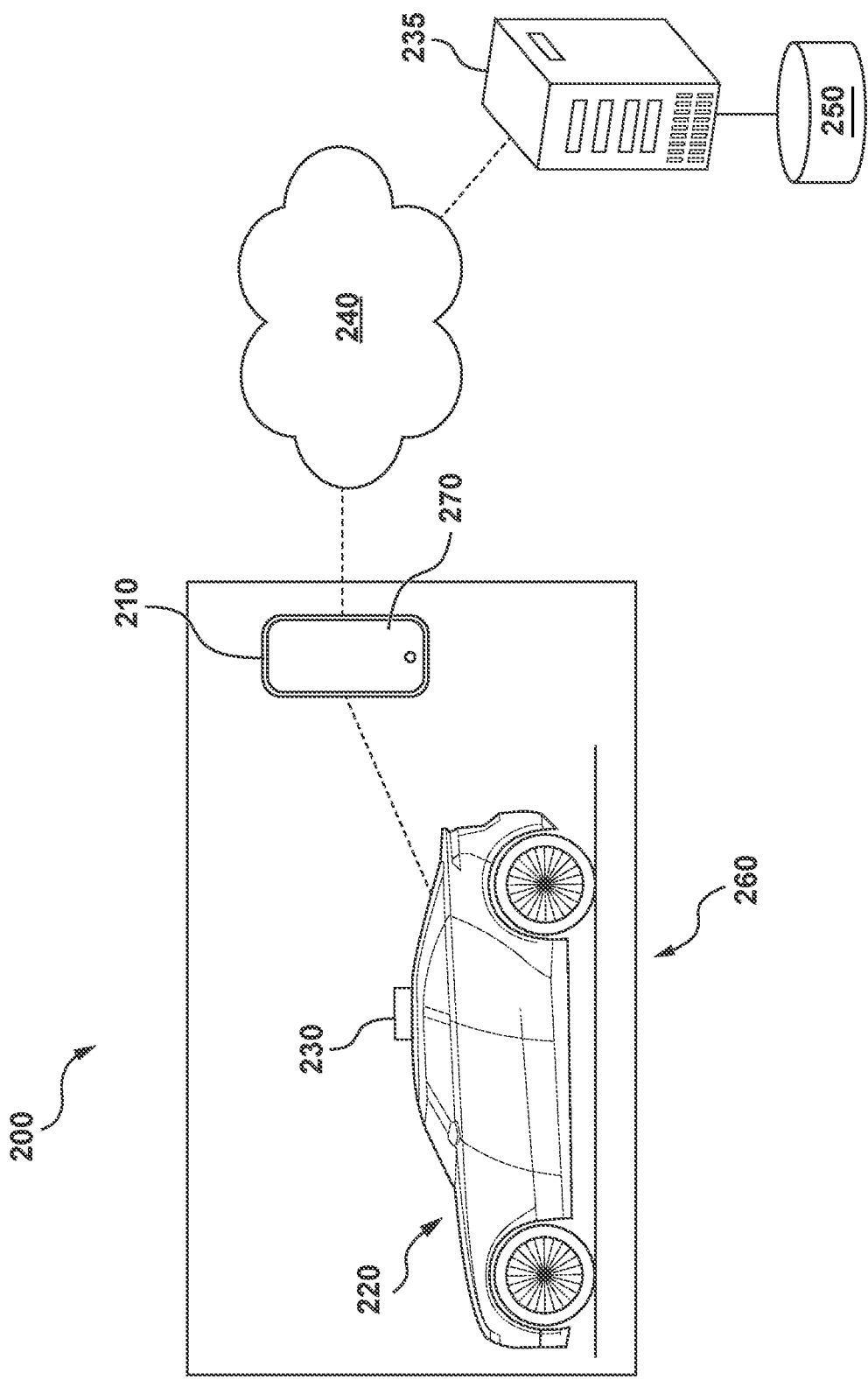
FIG. 2 depicts a networked computing environment suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220, a server 235 in communication with the electronic device 210 via the communication network 240 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, with which the electronic device 210 is associated, may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, and a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining a trajectory of the vehicle 220 at a given road segment considering obstacles therein, as will be described in greater detail below.

Sensor System

In the non-limiting embodiments of the present technology, the electronic device 210 comprises or has access to a sensor system 230. According to these embodiments, the sensor system 230 may comprise a plurality of sensors allowing for various implementations of the present technology. Examples of the plurality of sensors include but are not limited to: cameras, LIDAR sensors, and RADAR sensors, etc. The sensor system 230 is operatively coupled to the processor 110 for transmitting the so-captured information to the processor 110 for processing thereof, as will be described in greater detail herein below.

The sensor system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the sensor system 230 can be mounted in a dedicated enclosure (not depicted) mounted on the top of the vehicle 220.

Further, the spatial placement of the sensor system 230 can be designed taking into account the specific technical configuration thereof, configuration of the enclosure, weather conditions of the area where the vehicle 220 is to be used (such as frequent rain, snow, and other elements) or the like.

In the non-limiting embodiments of the present technology, the sensor system 230 may comprise a sensor configured to capture an image of a surrounding area 260. In this regard, the sensor system 230 may be a camera or a plurality thereof (not separately depicted).

How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure).

In some embodiments of the present technology, the camera (or one or more cameras that make up the implementation of the sensor system 230) is configured to capture a pre-determined portion of the surrounding area 260 around the vehicle 220. In some embodiments of the present technology, the camera is configured to capture an image (or a series of images) that represent approximately 90 degrees of the surrounding area 260 around the vehicle 220 that are along a movement path of the vehicle 220.

In other embodiments of the present technology, the camera is configured to capture an image (or a series of images) that represent approximately 180 degrees of the surrounding area 260 around the vehicle 220 that are along a movement path of the vehicle 220. In yet additional embodiments of the present technology, the camera is configured to capture an image (or a series of images) that represent approximately 360 degrees of the surrounding area 260 around the vehicle 220 that are along a movement path of the vehicle 220 (in other words, the entirety of the surrounding area around the vehicle 220).

In a specific non-limiting example, the camera can be of the type available from FLIR Integrated Imaging Solutions Inc., 12051 Riverside Way, Richmond, BC, V6 W 1K7, Canada. It should be expressly understood that the camera can be implemented in any other suitable equipment.

In the non-limiting embodiments of the present technology, the sensor system 230 may further comprise a LIDAR instrument (not separately depicted). Lidar stands for LIght Detection and Ranging. It is expected that a person skilled in the art will understand the functionality of the LIDAR instrument, but briefly speaking, a transmitter (not depicted) of the LIDAR sends out a laser pulse and the light particles (photons) are scattered back to a receiver (not depicted) of the LIDAR instrument. The photons that come back to the receiver are collected with a telescope and counted as a function of time. Using the speed of light ($\sim 3 \times 10^8$ m/s), the processor 110 can then calculate how far the photons have travelled (in the round trip). Photons can be scattered back off of many different entities surrounding the vehicle 220, such as other particles (aerosols or molecules) in the atmosphere, other cars, stationary objects or potential obstructions in front of the vehicle 220.

In a specific non-limiting example, the LIDAR instrument comprised in the sensor system 230 can be implemented as the LIDAR based sensor that may be of the type available from Velodyne LiDAR, Inc. of 5521 Hellyer Avenue, San Jose, Calif. 95138, United States of America. It should be expressly understood that the LIDAR instrument can be implemented in any other suitable equipment.

In some embodiments of the present technology, the LIDAR instrument comprised in the sensor system 230 can be implemented as a plurality of LIDAR based sensors, such as three, for example, or any other suitable number.

In the non-limiting embodiments of the present technology, the sensor system 230 may further comprise a RAdio Detection And Ranging (RADAR) instrument (not separately depicted). Briefly speaking, the RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects.

In alternative embodiments of the present technology, there may be a separate antenna for receiving waves, and a separate antenna for transmitting waves. The processor used for determining properties of surrounding objects may be the processor 110.

In some embodiments of the present technology, the RADAR instrument used in the sensor system 230 may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the RADAR instrument comprised in the sensor system 230 may be of the type available from Robert Bosch GmbH of Robert-Bosch-Platz 1, 70839 Gerlingen, Germany. It should be expressly understood that the RADAR instrument can be implemented in any other suitable equipment.

In some non-limiting embodiments of the present technology, the sensor system 230 may be used, by the processor 110, for image calibration. For example, using an image captured by the camera and the LIDAR point cloud captured by the LIDAR instrument, the processor 110 is configured to identify a given region of the image to correspond to a given region of the LIDAR point cloud captured by the LIDAR instrument. In other embodiments of the present technology, the sensor system 230 are calibrated such that for the image captured by the camera, the LIDAR point cloud captured by the LIDAR instrument, and the RADAR data captured by the RADAR instrument, the processor 110 is configured to identify a given region of the image to correspond to a given region of the LIDAR point cloud and the RADAR data.

In the non-limiting embodiments of the present technology, the vehicle 220 further comprises or has access to other sensors (not separately depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

Communication Network

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations of the communication network 240 are for illustration purposes only. How a communication link (not separately numbered) between the electronic device 210 and the communication network 240 is implemented will depend inter alia on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 240 may also use a wireless connection with a server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like.

In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Storage

In FIG. 2, there is also depicted a storage 250 communicatively coupled to the server 235. In some embodiments, however, the storage 250 may be communicatively coupled to the electronic device 210 and/or may be implemented within the electronic device 210 and/or may be communicatively coupled to any other processor of the networked computer environment 200.

In at least some embodiments, it is contemplated that the storage 250 may be used by the server 235, the electronic device 210 and/or any other processor of the networked computer environment 200 as a memory device for storing information. The storage 250 is configured to store information extracted, determined and/or generated by the processor 110 of the server 235 and/or the electronic device 210. Generally speaking, the storage 250 may receive data from the processor 110 which was generated by the processor 110 during processing for temporary and/or permanent storage thereof and may provide stored data to the processor 110 for use thereof. It is contemplated that the storage 250 may be split into several distributed storages, for providing a fault-tolerant storage system for example, without departing from the scope of the present technology.

It should be noted that in at least some embodiments of the present technology, the storage 250 may be implemented locally on the electronic device 210 and/or the server 235 (such as on a local memory, for example). It is also contemplated however that the storage 250 may be implemented remotely from the electronic device 210 and/or the server 235 (such as on a remote memory, for example).

Figure 3:
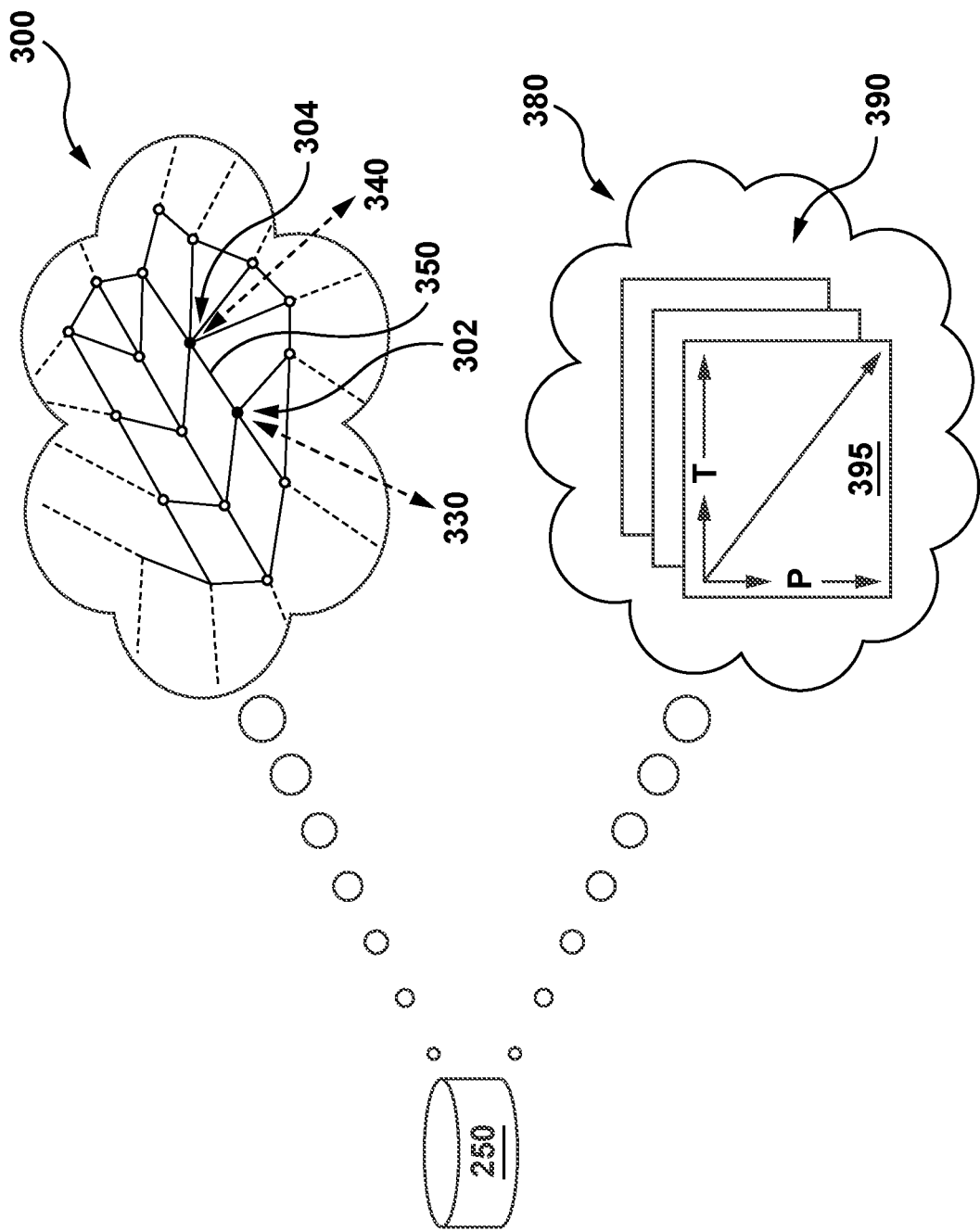
FIG. 3 depicts a graph-structure and index data stored in networked computing environment of FIG. 2, in accordance with at least some embodiments of the present technology.

In some embodiments of the present technology, the storage 250 may be configured to store a graph-structure 300 depicted in FIG. 3. Broadly speaking, the graph-structure 300 comprises a plurality of vertices and a plurality of edges, where each vertex represents time and variables defining a plurality of potential states of the vehicle 220 on a given road segment on which the vehicle 220 is currently travelling.

As it will become apparent from the description herein further below, the processor 110 may be configured to generate the graph-structure 300 for a given road segment that the vehicle 220 is to undertake or that the vehicle 220 is undertaking, and where a respective vertex of the graph-structure 300 defines a respective potential state in which the vehicle 220 may find itself along that given road segment. Put another way, the graph-structure 300 defines a number of potential states in which the vehicle 220 may potentially find itself along the road segment.

To better illustrate this, in FIG. 3, there is depicted a first vertex 302 and a second vertex 304 of the graph-structure 300. The first vertex 302 is connected to the second vertex 304 by an edge 350 of the graph-structure 300. As it can be seen, the first vertex 302 and the second vertex 304 are two sequential vertices of the graph-structure 300. Hence, the first vertex 302 defines a first potential state 320 of the vehicle 220 along the road segment and the second vertex 304 defines a second potential state 340 of the vehicle 220 along the road segment that is sequential to the first potential state 320. The edge 350 is representative of a transition between (i) the first potential state 320 of the vehicle 220 and (ii) the second potential state 340 of the vehicle 220.

It is contemplated that a given potential state of the vehicle 220 along the road segment may include a plurality of state values that define the respective potential state of the vehicle 220. For example, the plurality of state values of a given potential state of the vehicle 220 may include, but are not limited to: a position value corresponding to a respective potential position of the vehicle 220 on the given road segment, a time value corresponding to a time at which the vehicle 220 is potentially located at the respective potential position on the road segment; a vehicle orientation value at that potential time value and that potential position on the road segment, and the like. As such, it can be said that a given vertex of the graph-structure 300 may be associated with a respective plurality of state values that define the respective potential state of the vehicle 220 on the given road segment.

The storage 250 may also be configured to store index data 380. The index data 380 may be determined and stored by the electronic device 210 in the storage 250 in real-time. The index data 380 may be determined and stored by the electronic device 210 in the storage 250 prior to determining a trajectory for the vehicle 220 on the road segment (e.g., prior to an in-use phase of the index data 380). Broadly speaking, the index data 380 comprises a plurality of matrix structures 390 (sometimes referred to as "dynamic indexes") that may be generated, populated, stored, and/or iteratively updated in real-time by the electronic device 210.

As it will become apparent from the description herein further below, a given one of the plurality of matrix structures 390, such as a first matrix structure 395, for example, may be determined by the electronic device 210 in real-time for a respective "reference path" (or sometimes referred to as a "vehicle path") of the vehicle 220 on the road segment. The first matrix structure 395 may include a large number of "cells", each of which corresponds to a respective future position-time pair at which the vehicle 220 may potentially be present on the respective reference path on the road segment. Also, each "cell" may be populated with data indicative of a safety corridor for the vehicle 220 is the vehicle 220 is located at the respective future position-time pair.

Electronic Device

Figure 10:
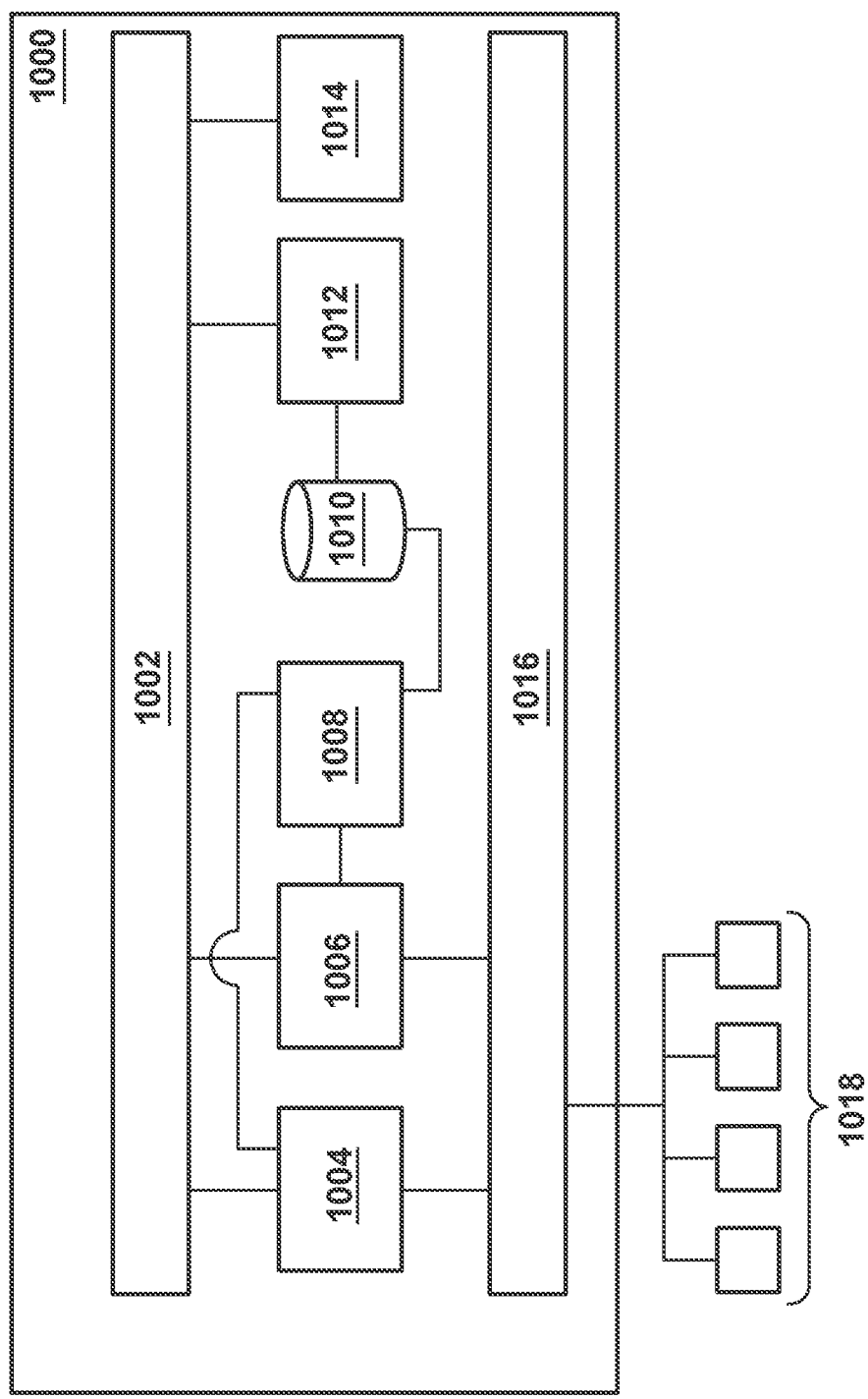
FIG. 10 depicts a schematic diagram of an electronic device for implementing certain non-limiting embodiments of the present technology.

It is contemplated that in at least some embodiments of the present technology, the electronic device 210 may be implemented in a similar manner to the electronic device 1000 of the FIG. 10. For example, the electronic device 210 may be configured to execute the one or more modules of the electronic device 1000, without departing from the scope of the present technology.

Developers of the present technology have devised methods and devices that allow determining a given trajectory of the vehicle 220 on the road segment, which reduces the risk of collision between the vehicle 220 and the neighbouring vehicles on the road segment. It is contemplated that in some embodiments, in order to determine this collision-risk-reducing trajectory for the vehicle 220 on the road segment, the electronic device 210 may use the graph-structure 300 in combination with the index data 380.

It should be noted that a given trajectory of the vehicle 220 on the road segment may be represented by a sequence of states of the vehicle 220 on the road segment. As such, developers of the present technology have devised methods and devices that allow selecting a given sequence of potential states from the graph-structure 300, such that if the vehicle 220 finds itself in the given sequence of states on the road segment, the risk of collision between the vehicle 220 and the neighbouring vehicles on the road segment will be reduced.

In at least one embodiment of the present technology, it is contemplated that the electronic device 210 may be configured to use the index data 380 in order to assign penalty scores to edges between vertices in the graph-structure 300, and which penalty scores may aid in selecting the series of states corresponding to the trajectory of the vehicle 220 on the road segment.

For example, the electronic device 210 may be configured to assign a penalty score to the edge 350 based on the index data 380 and where the penalty score is indicative of how safe the transition from the first potential state 330 of the vehicle 220 to the second potential state 340 of the vehicle 220 is.

In some embodiments, once the electronic device 210 determines and assigns penalty scores to respective edges of the graph-structure 300, the electronic device 210 may be configured to execute a "shortest-path-type" algorithm on the graph-structure 300 for determining a series of states of the vehicle 220 that is a most safe series of states on the road segment for the vehicle 220.

It should be noted that the shortest-path-type algorithm may be performed on the basis of the assigned penalty scores in the graph-structure 300—that is, the series of states of the vehicle 220 identified by the shortest-path-type algorithm from the graph-structure 300, and which represents the trajectory of the vehicle 220 on the road segment, is connected by a series of edges that has a smallest cumulative penalty score amongst other series of edges in the graph-structure 300. The electronic device 210 may then use information about the series of states identified by the shortest-path-type algorithm for generating the trajectory for the vehicle 220 on the road segment and which trajectory reduces the risk of collision between the vehicle 220 and neighbouring vehicles on the road segment.

Overall, it can be said that the electronic device 210 may be configured to (i) generate the index data 380, (ii) use the index data 380 to determine and assign penalty scores to respective edges of the graph-structure 300, (iii) determine a series of states of the vehicle 220 that is a most safe series of states on the road segment, and (iv) generate a trajectory for the vehicle 220 on the road segment based on the series of states of the vehicle 220. How the electronic device 210 is configured to generate the index data 380 (e.g., the plurality of matrix structures 390 for respective reference paths of the vehicle 220) and how the index data 380 may be used for assigning penalty scores to edges of the graph-structure 300 will now be discussed in turn.

In the present description, three scenarios will be described for illustrating how the electronic device 210 may be configured to generate one or more matrix structures from the plurality of matrix structures 390.

Figure 4:
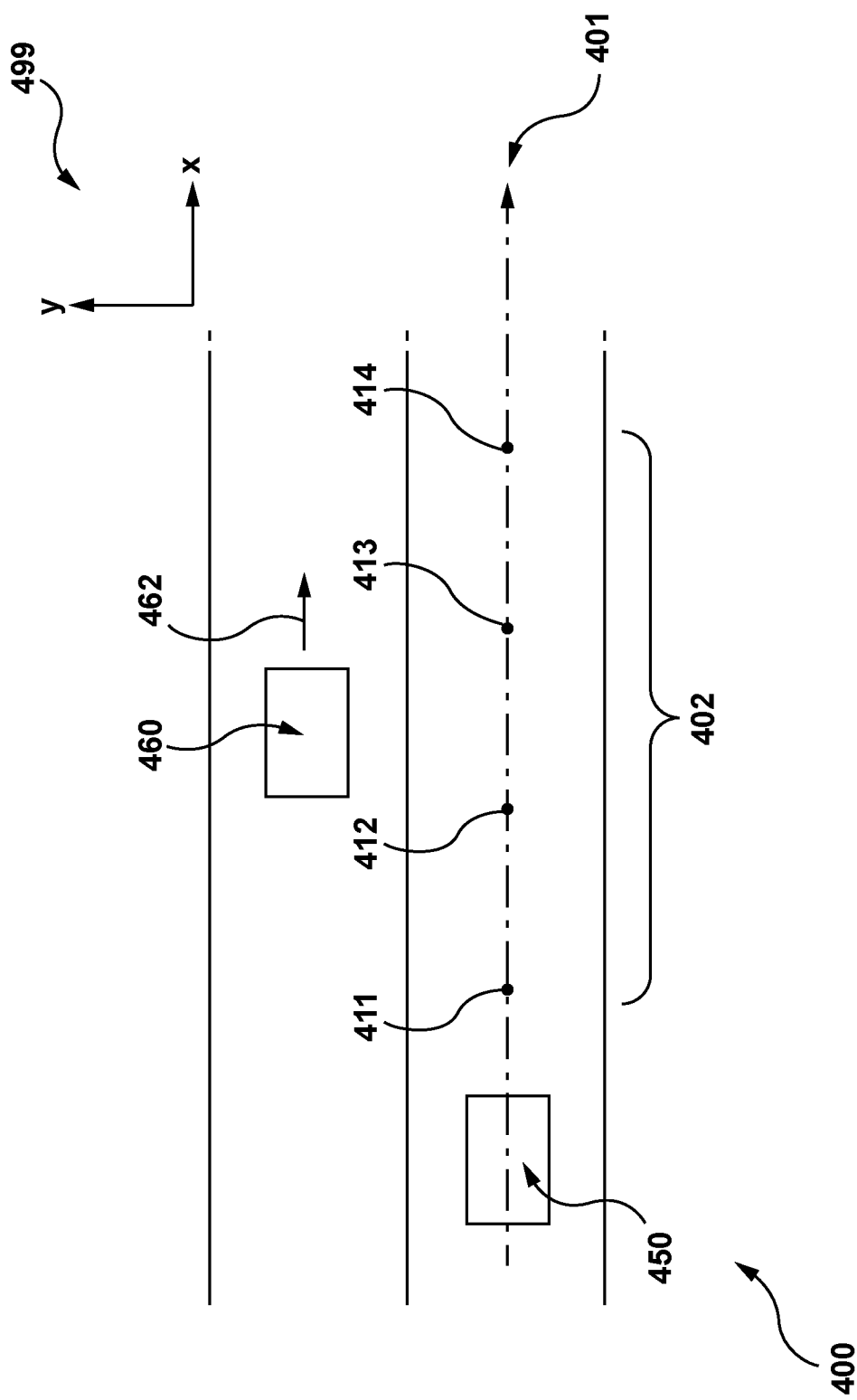
FIG. 4 depicts a road segment in a first scenario for determining a matrix structure, in accordance with at least some embodiments of the present technology.

With reference to FIG. 4, there is depicted a first scenario illustrating how the electronic device 210 may be configured to generate a given matrix structure. There is depicted a road segment 400 having two lanes separated by a solid line indicative of a prohibited lane change. There is also depicted a representation 450 of the vehicle 220 travelling in one lane, which will be referred to as a current lane of the vehicle 220. There is also depicted a representation 460 of a neighbouring vehicle travelling in the other lane, which will be referred to as a neighbouring lane of the vehicle 220.

The electronic device 210 may be configured to determine a reference path 401 for the vehicle 220 in the current lane. It should be noted that the reference path 401 may sometimes be referred as a "default" reference path (or default vehicle path) of the vehicle 220, since, it is assumed that in normal conditions the vehicle 220 is ought to travel along the centre line of the current lane by default. Indeed, developers of the present technology have realized that in normal conditions, such as for example when the vehicle 220 is travelling along a straight lane, the vehicle 220 ought to be travelling along the centre line of that current lane for safety purposes.

As mentioned above, the electronic device 210 may be configured to generate a given matrix structure for a respective reference path. For example, the electronic device 210 may be configured to generate a matrix structure 500 depicted in FIG. 5 for the reference path 401 of the vehicle 220 in the current lane. Reference will now be made to both FIG. 4 and FIG. 5.

It is contemplated that in some embodiments of the present technology, the electronic device 210 may be configured to employ matrix-booting information for generating the matrix structure 500 for the reference path 401. For example, the matrix-booting information may include data indicative of (i) a distance horizon, (ii) a distance horizon step, (iii) a timeline horizon, and (iv) a timeline horizon step for the reference path 401. The electronic device 210 may use the matrix-booting information for generating a plurality of cells (not numbered) within the matrix structure 500.

For example, the distance horizon may be indicative of value of 200 m along the reference path 401—which, as it will become apparent from the description herein further below, means that the matrix structure 500 is to store information about distances between the neighbouring vehicle and the vehicle 220 for a next 200 m along the reference path 401.

In the same example, the distance horizon step may be of 0.25 m—which, as it will become apparent from the description herein further below, means that the matrix structure 500 is to store information about distances between the neighbouring vehicle and the vehicle 220 for each 0.25 m of a next 200 m along the reference path 401.

Hence, it can be said that the distance horizon and the distance horizon step may be indicative of a number of rows in the matrix structure 500 that the electronic device 210 is configured to generate. In some embodiments, the distance horizon and the distance horizon step may depend on a current velocity of the vehicle 220. For example, the faster the vehicle 220 is currently travelling the longer the distance horizon may be and/or the smaller the distance horizon step may be—which results in a larger number of rows that the electronic device 210 is to generate for the matrix structure 500. In other cases, the distance horizon and/or the distance horizon step may be pre-selected, which results in a pre-selected number of rows that the electronic device 210 is to generate for the matrix structure 500.

To better illustrate this, in FIG. 4, there is depicted a plurality of anchor points 402 along the reference path 401. The plurality of anchor points 402 comprises a first anchor point 411, a second anchor point 412, a third anchor point 413, a fourth anchor point 414, and other potential anchor points (not illustrated). In this example, the distance between the first anchor point 411 and a last anchor point (not numbered) of the plurality of anchor points 402 may be equal to the distance horizon, and distances separating respective pairs of anchor points in the plurality of anchor points 402 may be equal to the distance horizon step.

It should be noted that a value of 200 m for the distance horizon and a value of 0.25 m for the distance horizon step have been presented for illustrative purposes and that other values for the distance horizon and the distance horizon step may be employed in various implementations of the present technology.

Figure 5:
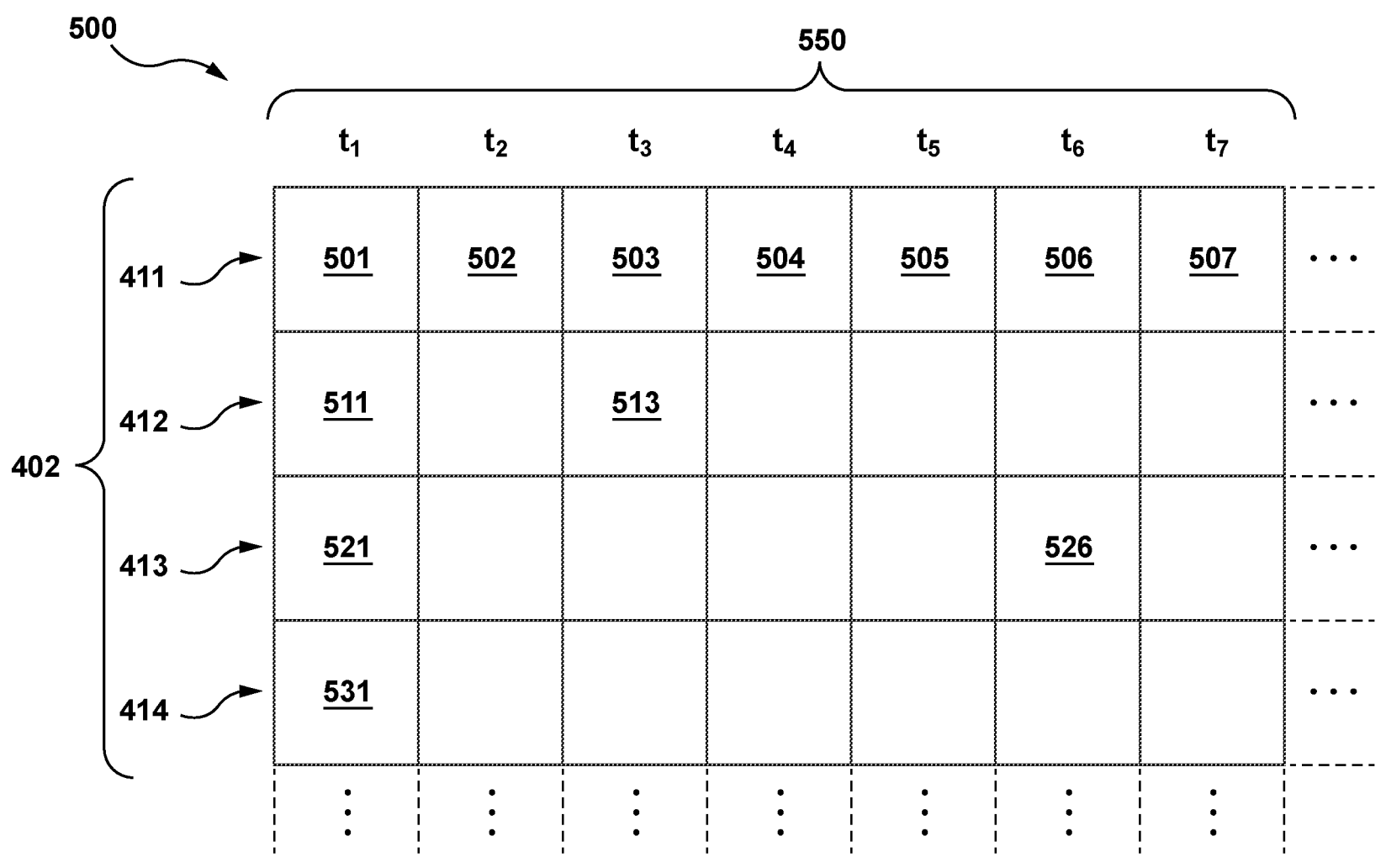

It should be noted that the electronic device 210 may be configured to generate a respective row in the matrix structure 500 of FIG. 5 for a respective one of the plurality of anchor points 402, such as a first row for the first anchor point 411, a second row for the second anchor point 412, a third row for the third anchor point 413, a fourth row for the fourth anchor point 414, and so forth.

As mentioned above, the matrix-booting information also includes the timeline horizon. For example, the timeline horizon may be a value of 20 s—which, as it will become apparent from the description herein further below, means that the matrix structure 500 is to store information about distances between the neighbouring vehicle and the vehicle 220 for a next 20 s on the reference path 401.

In the same example, the timeline horizon step may be a value of 0.1 s—which, as it will become apparent from the description herein further below, means that the matrix structure 500 is to store information about distances between the neighbouring vehicle and the vehicle 220 for each 0.1 s of the next 20 s on the reference path 401.

Hence, it can be said that the timeline horizon and the timeline horizon step may be indicative of a number of columns in the matrix structure 500 that the electronic device 210 is configured to generate. In some embodiments, the timeline horizon and the timeline horizon step may depend on a current velocity of the vehicle 220. For example, the faster the vehicle 220 is currently travelling the longer the timeline horizon may be and/or the smaller the timeline sub-step may be—which results in a larger number of columns that the electronic device 210 is to generate for the matrix structure 500. In other cases, the timeline horizon and/or the timeline sub-step may be pre-selected, which results in a pre-selected number of rows that the electronic device 210 is to generate for the matrix structure 500.

It should be noted that a value of 20 s for the timeline horizon and a value of 0.1 s for the timeline horizon step have been presented for illustrative purposes and that other values for the timeline horizon and the timeline horizon step may be employed in various implementations of the present technology.

It should be noted that the electronic device 210 may be configured to generate a respective column in the matrix structure 500 of FIG. 5 for a respective one of a series of moments in time 550, such as a first column for a first moment in time t1, a second column for a second moment in time t2, a third column for a third moment in time t3, a fourth column for a fourth moment in time t4, a fifth column for a fifth moment in time t5, a sixth column for a sixth moment in time t6, a seventh column for a seventh moment in time t7, and so forth.

Overall, it can be said that the electronic device 210 may be configured to employ the matrix-booting information (e.g., the distance horizon, the distance horizon step, the timeline horizon, and the timeline horizon step) for generating the matrix structure 500. The distance horizon and the distance horizon step may be employed by the electronic device 210 to determine a number of anchor points in the plurality of anchor points 402 along the reference path 401, whereas the timeline horizon and the timeline horizon step may be employed by the electronic device 210 to determine a number of future moments in time in the series of future moments in time 550 along the reference path 401. Therefore, the electronic device 210 is configured to generate the matrix structure 500 that includes (i) a number of rows corresponding to the number of anchor points in the plurality of anchor point 402, and (ii) a number of columns corresponding to a number of future moments in time from the series of future moments in time 550.

As a result, the matrix structure 500 comprises a number of "cells", where each cell corresponds to a respective future position-time pair of the vehicle 220 along the reference path 401. It should be noted that a given future position-time pair is indicative of when and where the vehicle 220 will potentially be located in the future along the reference path 401.

For example, for the first column of the matrix structure 500:
  a cell 501 corresponds to a respective future position-time pair of vehicle 220 along the reference path 401 and which is indicative of a potential location of the vehicle 220 at the first anchor point 411 at the first moment in time t1;
  a cell 511 corresponds to a respective future position-time pair of vehicle 220 along the reference path 401 and which is indicative of a potential location of the vehicle 220 at the second anchor point 412 at the first moment in time t1;
  a cell 521 corresponds to a respective future position-time pair of vehicle 220 along the reference path 401 and which is indicative of a potential location of the vehicle 220 at the third anchor point 413 at the first moment in time t1;
  a cell 531 corresponds to a respective future position-time pair of vehicle 220 along the reference path 401 and which is indicative of a potential location of the vehicle 220 at the fourth anchor point 414 at the first moment in time t1; and
  so forth.

In the same example, for the first row of the matrix structure 500:
  the cell 501 corresponds to the respective future position-time pair of vehicle 220 along the reference path 401 and which is indicative of a potential location of the vehicle 220 at the first anchor point 411 at the first moment in time t1;
  the cell 502 corresponds to the respective future position-time pair of vehicle 220 along the reference path 401 and which is indicative of a potential location of the vehicle 220 at the first anchor point 411 at the second moment in time t2;
  the cell 503 corresponds to the respective future position-time pair of vehicle 220 along the reference path 401 and which is indicative of a potential location of the vehicle 220 at the first anchor point 411 at the third moment in time t3;
  the cell 504 corresponds to the respective future position-time pair of vehicle 220 along the reference path 401 and which is indicative of a potential location of the vehicle 220 at the first anchor point 411 at the fourth moment in time t4;
  the cell 505 corresponds to the respective future position-time pair of vehicle 220 along the reference path 401 and which is indicative of a potential location of the vehicle 220 at the first anchor point 411 at the fifth moment in time t5;
  the cell 506 corresponds to the respective future position-time pair of vehicle 220 along the reference path 401 and which is indicative of a potential location of the vehicle 220 at the first anchor point 411 at the sixth moment in time t6;
  the cell 507 corresponds to the respective future position-time pair of vehicle 220 along the reference path 401 and which is indicative of a potential location of the vehicle 220 at the first anchor point 411 at the seventh moment in time t7; and
  so forth.

It is contemplated that in at least some embodiments, a potential location of the vehicle 220 at a given anchor point from the plurality of anchor points 402 may be defined as an "x" and "y" coordinates (in a system of coordinates 499 depicted in FIG. 4) of the position of the given anchor point along the reference path 401. For example, a potential location of the vehicle 220 at the first anchor point 411 may be defined as "x" and "y" coordinates of the position of the first anchor point 411 along the reference path 401.

Hence, it can be said that cells of the first row of the matrix structure 500 (e.g., the cells 501, 502, 503, 504, 505, 506, and 507) correspond to the respective future position-time pairs, and where the respective future position-time pairs are indicative of (i) the respective future moments in time (e.g., t1, t2, t3, t4, t5, t6, and t7, respectively), and (ii) the coordinates of the position of the first anchor point 411 along the reference path 401.

Similarly, it can be said that cells of the third row of the matrix structure 500 (e.g., including the cell 521, a cell 526 and other cells) correspond to the respective future position-time pairs, and where the respective future position-time pairs are indicative of (i) the respective future moments in time, and (ii) the coordinates of the position of the third anchor point 413 along the reference path 401. It should also be noted that a cell 513 corresponds to the respective future position-time pair indive of (i) the third moment in time t3, and (ii) the position of the second anchor point 412.

It should be noted that the electronic device 210 may generate the matrix structure 500 in a row-by-row manner, or alternatively, in a column-by-column manner. In other words, during the generation of the matrix structure 500, the electronic device 210 may be configured to associate the coordinates of each anchor point from the plurality of anchor points 402 with the series of moments in time 550 (e.g., row-by-row manner), or alternatively, associate each moment in time from the series of moments in time 550 with the respective coordinates of the plurality of anchor points 402 (e.g., column-by-column manner).

As previously alluded to, once the electronic device 210 generates the matrix structure 500, the electronic device 210 may be configured to populate the matrix structure 500 with "inter-vehicular-distance data". The electronic device 210 may be configured to determine the inter-vehicular-distance data based on a predicted vehicle trajectory of the neighbouring vehicle.

How the electronic device 210 is configured to acquire the predicted vehicle trajectory, how the electronic device 210 is configured to generate the inter-vehicular-distance data and how the electronic device 210 is configured to populate the matrix structure 500 will now be described in turn.

As mentioned above, the electronic device 210 may be coupled to the sensor system 230 of the vehicle 220. As such, the sensor system 230 may be configured to capture movement data 462 depicted in FIG. 4 and which is associated with the neighbouring vehicle. The electronic device 210 may then be configured to analyse the so-captured movement data and generate the predicted vehicle trajectory of the neighbouring vehicle. The manner in which the electronic device 210 generates the predicted vehicle trajectory based on the movement data may vary and depend on a specific implementation of the present technology.

Nevertheless, the predicted vehicle trajectory associated with the neighbouring vehicle on the road segment 400 is indicative of inter alia a plurality of estimated neighbour vehicle position-time pairs at which the neighbouring vehicle is estimated to be located in the future on the road segment 400. For example, a given estimated neighbour vehicle position-time pair may include (i) "x" and "y" coordinates of the estimated future position of the neighbouring vehicle, and (ii) an estimated future moment in time associated with the estimated future position of the neighbouring vehicle.

Once the electronic device 210 has generated the predicted vehicle trajectory and the matrix structure 500, the electronic device 210 may be configured to generate the inter-vehicular-distance data and populate the matrix structure 500 therewith. Broadly speaking, the electronic device 210 is configured to generate the inter-vehicular-distance data by comparing (i) the plurality of the estimated neighbour vehicle position-time pairs of the predicted vehicle trajectory and (ii) the future position-time pairs associated with respective cells of the matrix structure 500.

To better illustrate this, let's take the example of the future position-time pair associated with the cell 501 of the matrix structure 500. As explained above, the future position-time pair associated with the cell 501 corresponds to a pair including (i) the "x" and "y" coordinates of the first anchor point 411 and (ii) the first moment in time t1. As such, the electronic device 210 may be configured to compare (i) the future position-time pair including the "x" and "y" coordinates of the first anchor point 411 and the first moment in time t1, against (ii) each of the plurality of the estimated neighbour vehicle position-time pairs of the predicted vehicle trajectory.

It should be noted that the purpose of this comparison by the electronic device 210 is to determine, while assuming (i) that the vehicle 220 is located at the "x" and "y" coordinates of the first anchor point 411 at the first moment in time t1 and (ii) that the neighbouring vehicle will follow the predicted vehicle trajectory, whether or not the neighbouring vehicle and the vehicle 220 will be located at least partially side-by-side on the road segment 400 at the first moment in time t1. To that end, the electronic device 210 may be configured to determine whether any one of the plurality of estimated neighbouring vehicle position-time pairs from the predicted vehicle trajectory includes both (i) the first moment in time t1, and (ii) the "x" coordinate of the first anchor point 411.

Let it be assumed that none of the plurality of estimated neighbouring vehicle position-time pairs from the predicted vehicle trajectory includes both (i) the first moment in time t1, and (ii) the "x" coordinate of the first anchor point 411. This means that, the vehicle 220 and the neighbouring vehicle will not find themselves at least partially side-by-side at the first moment in time t1 at the "x" coordinate of the first anchor point 411, while assuming (i) that the vehicle 220 is located at the "x" and "y" coordinates of the first anchor point 411 at the first moment in time t1 and (ii) that the neighbouring vehicle will follow the predicted vehicle trajectory.

In such a situation, the electronic device 210 may be configured to store a value in the cell 501 indicative of that no neighbouring vehicle is located side-by-side with the vehicle 220 at the future position-time pair of the cell 501. It is also contemplated that in this example the electronic device 210 may also be configured to leave the cell 501 empty.

Now let's take the example of the future position-time pair associated with the cell 526 of the matrix structure 500 which corresponds to a pair including (i) the "x" and "y" coordinates of the third anchor point 413 and (ii) the sixth moment in time t6. As such, the electronic device 210 may be configured to compare (i) the future position-time pair including the "x" and "y" coordinates of the third anchor point 413 and the sixth moment in time t6, against (ii) the plurality of estimated neighbour vehicle position-time pairs of the predicted vehicle trajectory of the neighbouring vehicle.

In this case, let it be assumed that one of the plurality of estimated neighbouring vehicle position-time pairs from the predicted vehicle trajectory includes both (i) the sixth moment in time t6, and (ii) the "x" coordinate of the third anchor point 413. This means that, the vehicle 220 and the neighbouring vehicle will find themselves at least partially side-by-side at the moment in time t6 at the "x" coordinate of the third anchor point 413, assuming (i) that the vehicle 220 is located at the coordinates of the third anchor point 413 at the sixth moment in time t6 and (ii) that the neighbouring vehicle will follow the predicted vehicle trajectory.

In such a situation, the electronic device 210 may be configured to determine an inter-vehicular distance (i) between the vehicle 220 and the neighbouring vehicle and (ii) at the future position-time pair associated with the cell 526 (and/or the matching estimated neighbouring vehicle position-time pair of the predicted vehicle trajectory). To that end, the electronic device 210 may be configured to determine a difference between (i) the "y" coordinate of the third anchor point 413 and (ii) the "y" coordinate of the matching estimated neighbouring vehicle position-time pair. The electronic device 210 may then be configured to store the so-determined distance in the cell 526 (e.g., populate the cell 526 with the so-determined distance). In some non-limiting embodiments of the present technology, the inter-vehicular distance may further be associated with an indication of the direction, such as left or right.

It should be noted that in this example, the difference between (i) the "y" coordinate of the third anchor point 413 and (ii) the "y" coordinate of the matching estimated neighbouring vehicle position-time pair is positive. As such, the so-determine distance stored in the cell 526 may also be indicative of that, not only the neighbouring vehicle will be located side-by-side with the vehicle 220, but will be located on the left side of the vehicle 220, while assuming (i) that the vehicle 220 is located at the coordinates of the third anchor point 413 at the sixth moment in time t6 and (ii) that the neighbouring vehicle will follow the predicted vehicle trajectory.

Similarly to what has been described above for the cells 501 and 526, the electronic device 210 may be configured to perform a comparison between (i) each respective cell of the matrix structure 500 and (ii) each one of the plurality of estimated neighbouring vehicle position-time pair of the predicted vehicle trajectory, to determine whether or not (i) a given future position-time pair in the matrix structure 500 matches in time and "x" coordinate (ii) any one of the plurality of estimated neighbouring vehicle position-time pairs. If such a match is found, the electronic device 210 may be configured to store a distance in the respective cell of the matrix structure 500 indicative of a difference between (i) the "y" coordinate of the respective future position-time pair and (ii) the "y" coordinate of the so-matching estimated neighbouring vehicle position-time pair.

In summary, it can be said that the electronic device 210 may be configured to, for each future position-time pair in the matrix structure 500 (e.g., each cell of the matrix structure 500), use the predicted object trajectory (e.g., the plurality of estimated neighbouring vehicle position-time pairs) for determining a distance between the neighboring vehicle and the vehicle 220 as if the vehicle 220 is located at the respective future position-time pair and as if the neighboring vehicle is travelling in accordance with the predicted object trajectory. It should be noted that the so-determined distance for the respective future position-time pair is representative of a safety corridor for the vehicle 220 if the vehicle 220 is located at the respective future position-time pair. The electronic device 210 may then be configured to store the populated matrix structure 500 with the so-determined distances in the storage 250.

Figure 6:
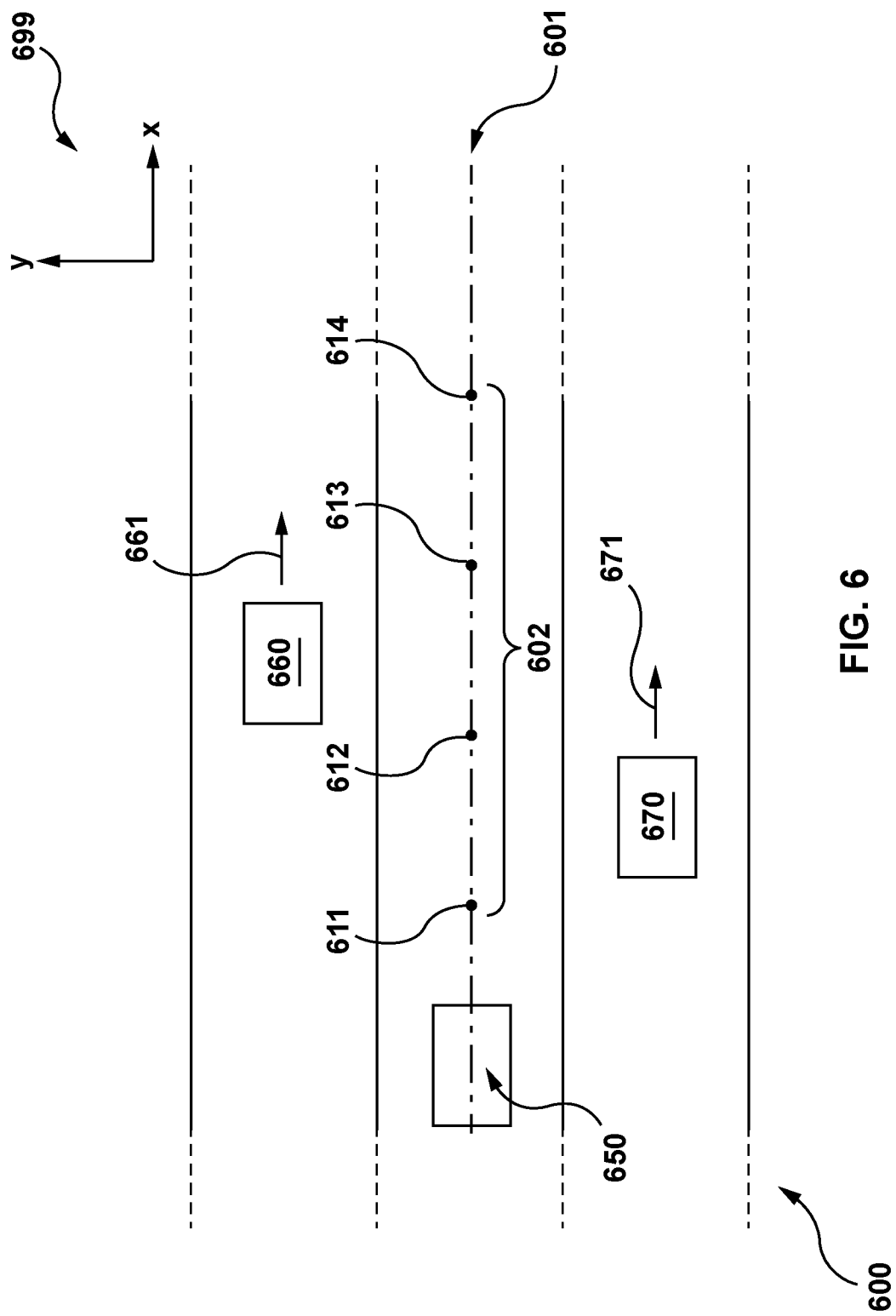
FIG. 6 depicts a road segment in a second scenario for determining a matrix structure, in accordance with at least some embodiments of the present technology.

With reference to FIG. 6, there is depicted a second scenario illustrating how the electronic device 210 may be configured to generate a given matrix structure. There is depicted a road segment 600 having three lanes separated by solid lines indicative of prohibited lane changes. There is also depicted a representation 650 of the vehicle 220 travelling in a middle lane, which will be referred to as a current lane of the vehicle 220. There is also depicted a representation 660 of a left neighbouring vehicle travelling in a left lane, and a representation 670 of a right neighbouring vehicle travelling in a right lane. There is also depicted a reference path 601 for the vehicle 220. The reference path 601 may be generated similarly to how the electronic device 201 generates the reference path 401 of FIG. 4.

The electronic device 210 may be configured to employ the matrix-booting information for generating a respective matrix structure (not depicted), similarly to how the electronic device 210 employs the matrix-booting information for generating the matrix structure 500 of FIG. 5. For example, the matrix structure for the reference path 601 may include rows associated with a plurality of anchor points 602, such that a first anchor point 611 is associated with a first row, a second anchor point 612 is associated with a second row, a third anchor point 613 is associated with a third row, a fourth anchor point 614 is associated with a fourth row, and so on. In the same example, the matrix structure for the reference path 601 may also include columns associated with a series of moments in time, similarly to how the matrix structure 500 includes columns associated with the series of moments in time 550.

The electronic device 210 may also be configured to acquire movement data 661 for the left neighbouring vehicle and movement data 671 for the right neighbouring vehicle, similarly to how the electronic device 210 is configured to acquire the movement data 462 for the neighbouring vehicle of FIG. 4. Also, the electronic device 210 may be configured to generate a first predicted vehicle trajectory for the left neighbouring vehicle based on the movement data 661, and a second predicted vehicle trajectory for the right neighbouring vehicle based on the movement data 671, similarly to how the electronic device 210 is configured to generate the predicted vehicle trajectory for the neighbouring vehicle of FIG. 4 based on the movement data 462.

As such, the electronic device 210 may be configured to generate a first plurality of estimated neighbouring vehicle position-time pairs of the first predicted vehicle trajectory for the left neighbouring vehicle, and a second plurality of estimated neighbouring vehicle position-time pairs of the second predicted vehicle trajectory for the right neighbouring vehicle.

The electronic device 210 may also be configured to determine inter-vehicular-distance data for the respective matrix structure associated with the reference path 601. To that end, the electronic device 210 may be configured to use a plurality of future position-time pairs from the matrix structure associated with the reference path 601 for comparison against the first plurality of estimated neighbouring vehicle position-time pairs of the first predicted vehicle trajectory for the left neighbouring vehicle, similarly to how the electronic device 210 may be configured to use the plurality of future position-time pairs from the matrix structure 500 for comparison against the plurality of estimated neighbouring vehicle position-time pairs of the predicted vehicle trajectory of the neighbouring vehicle of FIG. 4. The electronic device 210 may be configured to populate the matrix structure associated with the reference path 601 based on matches between (i) the plurality of future position-time pairs from the matrix structure associated with the reference path 601 and (ii) the first plurality of estimated neighbouring vehicle position-time pairs of the first predicted vehicle trajectory for the left neighbouring vehicle, similarly to how the electronic device 210 is configured to populate the matrix structure 500 based on matches between (i) the plurality of future position-time pairs from the matrix structure 500 and (ii) the plurality of estimated neighbouring vehicle position-time pairs of the predicted vehicle trajectory of the neighbouring vehicle of FIG. 4.

However, in addition to the above, it is contemplated that in this second scenario, the electronic device 210 may also be configured to populate the matrix structure associated with the reference path 601 based on matches between (i) the plurality of future position-time pairs from the matrix structure associated with the reference path 601 and (ii) the second plurality of estimated neighbouring vehicle position-time pairs of the second predicted vehicle trajectory for the right neighbouring vehicle.

Therefore, it can be said that some cells of the matrix structure associated with the reference path 601 may be populated with distances between the vehicle 220 and the left neighbouring vehicle, while other cells of the matrix structure associated with the reference path 601 may be populated with distances between the vehicle 220 and the right neighbouring vehicle. Naturally, depending on the road situation, the given cell of the matrix structure associated with the reference path 601 may be populated with distances between the vehicle 220 and the left neighbouring vehicle and the right neighbouring vehicle, if both such vehicles are present at a potential future position at the future moment in time.

In at least some embodiments of the present technology, it is contemplated that the electronic device 210 may find a match:

(i) between a given one of the plurality of future position-time pairs from the matrix structure associated with the reference path 601 and a given one of the first plurality of estimated neighbouring vehicle position-time pairs; and (ii) between the same given one of the plurality of future position-time pairs from the matrix structure associated with the reference path 601 and a given one of the second plurality of estimated neighbouring vehicle position-time pairs.

This means that the electronic device 210 may determine that the left neighbouring vehicle will be located at least partially side-by-side with the vehicle 220 at the "x" coordinate (see system of coordinates 699 on FIG. 6) of the given one of the plurality of future position-time pairs and that the right neighbouring vehicle will be located at least partially side-by-side with the vehicle 220 at the "x" coordinate of the given one of the plurality of future position-time pairs (while assuming that (i) the vehicle 220 will be located at the given one of the plurality of future position-time pairs from the matrix structure associated with the reference path 601, (ii) the left neighbouring vehicle will follow the first predicted vehicle trajectory, and (iii) the right neighbouring vehicle will follow the second predicted trajectory).

In this case, in one embodiment, the electronic device 210 may be configured to store in a cell of the matrix structure associated with the reference path 601, which cell corresponds to the given one of the plurality of future position-time pairs, both the distance between the left neighbouring vehicle and the vehicle 220 as well as the distance between the right neighbouring vehicle and the vehicle 220. In this embodiment, the cell may store a positive distance indicative of the distance between the left neighbouring vehicle and the vehicle 220, as well as a negative distance indicative of the distance between the right neighbouring vehicle and the vehicle 220

In this case, in another embodiment, the electronic device 210 may be configured to store in a cell of the matrix structure associated with the reference path 601, which cell corresponds to the given one of the plurality of future position-time pairs, a shortest distance between (i) the distance between the left neighbouring vehicle and the vehicle 220 as well as (ii) the distance between the right neighbouring vehicle and the vehicle 220.

Overall, it can be said that in at least some embodiments of the present technology, the electronic device 210 may be configured to, for each future position-time pair from the matrix structure associated with the reference path 601, use the first predicted vehicle trajectory associated with the left neighbouring vehicle and the second predicted vehicle trajectory associated with the right neighbouring vehicle for determining a distance between a closest neighbouring vehicle (amongst the left neighbouring vehicle and the right neighbouring vehicle) to the vehicle 220 as if the vehicle 220 is located at the respective future position-time pair.

Figure 7:
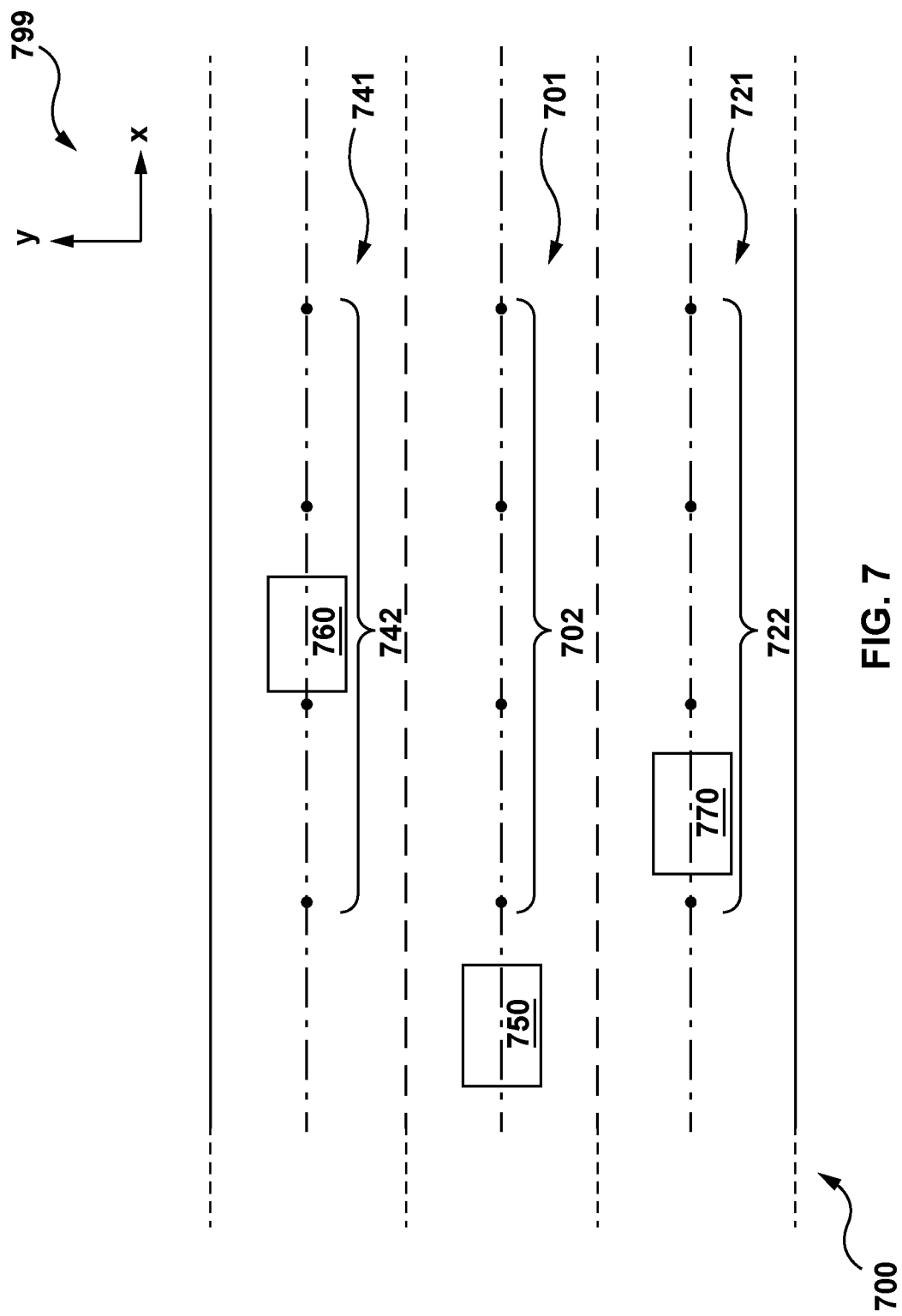
FIG. 7 depicts a road segment in a third scenario for determining a plurality of matrix structures, in accordance with at least some embodiments of the present technology.

With reference to FIG. 7, there is depicted a third scenario illustrating how the electronic device 210 may be configured to generate a given matrix structure. There is depicted a road segment 700 having three lanes separated by interrupted lines indicative of allowed lane changes. There is also depicted a representation 750 of the vehicle 220 travelling in a middle lane, which will be referred to as a current lane of the vehicle 220. There is also depicted a representation 760 of a left neighbouring vehicle travelling in a left lane, and a representation 770 of a right neighbouring vehicle travelling in a right lane. There are also depicted three reference paths, namely a middle lane reference path 701, a left lane reference path 741, and a right lane reference path 721.

Each one amongst the middle lane reference path 701, the left lane reference path 741, and the right lane reference path 721 may be generated by the electronic device 210 similarly to how the electronic device 201 generates the reference path 401 of FIG. 4. For example, the middle lane reference path 701 has a plurality of anchor points 702, the left lane reference path 741 has a plurality of anchor points 742, and the right lane reference path 721 has a plurality of anchor points 722. Coordinates of a given anchor point from any one of the middle lane reference path 701, the left lane reference path 741, and the right lane reference path 721, may be defined as "x" and "y" coordinates of a system of coordinate 799.

Figure 8:
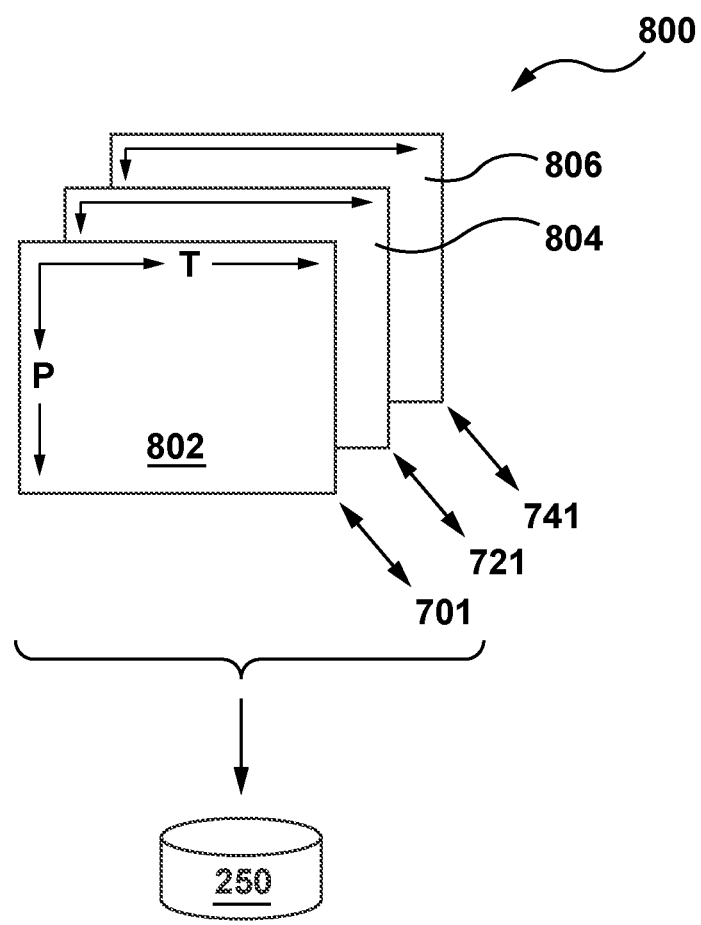
FIG. 8 depicts the plurality of matrix structures determined for the third scenario of FIG. 7, in accordance with at least some embodiments of the present technology.

With reference to FIG. 8, the electronic device 210 may be configured to generate a plurality of matrix structures 800 in this third scenario. For example, the electronic device 210 may be configured to generate a first matrix structure 802 for the middle lane reference path 701, a second matrix structure 804 for the right lane reference path 721, and a third matrix structure 806 for the left lane reference path 741.

It should be noted that the electronic device 210 may be configured to populate the first matrix structure 802 associated with the middle lane reference path 701 by using both (i) a predicted vehicle trajectory of the left neighbouring vehicle, and (ii) a predicted trajectory of the right neighbouring vehicle, similarly to how the electronic device 210 is configured to populate the matrix structure associated with the reference path 601 of FIG. 6 by using both (i) the predicted vehicle trajectory of the left neighbouring vehicle of FIG. 6, and (ii) the second predicted trajectory of the right neighbouring vehicle of FIG. 6.

In at least some embodiments of the present technology, it is contemplated that when the electronic device 210 is configured to populate a given matrix structure associated with a given reference path in a given lane, the electronic device 210 may be configured to use predicted vehicle trajectories of neighbouring vehicles that are not located in the given lane.

For example, the electronic device 210 may be configured to populate the second matrix structure 804 associated with the right lane reference path 721 by using only the predicted vehicle trajectory of the left neighbouring vehicle, since the right neighbouring vehicle is travelling in the right lane. In the same example, the electronic device 210 may be configured to populate the third matrix structure 806 associated with the left lane reference path 741 by using only the predicted vehicle trajectory of the right neighbouring vehicle, since the left neighbouring vehicle is travelling in the left lane.

How the electronic device 210 is configured to use the index data 380 for assigning penalty scores for edges of the graph-structure 300 will now be described. To better illustrate this, let it be assumed that the vehicle 220 is travelling on the road segment 400 of the first scenario depicted in FIG. 4 and that the index data 380 includes the matrix structure 500.

As mentioned above, the graph-structure 300 includes the edge 350 representing the transition between the first potential state 330 of the vehicle 220 on the road segment 400 and the second potential state 340 of the vehicle 220 on the road segment 400. Also, it should be recalled that a given potential state of the vehicle 220 on the road segment 400 is stored in the graph-structure 300 in association with a respective position and a respective time where the vehicle 220 may find itself on the road segment 400.

In some embodiments of the present technology, the electronic device 210 may be configured to generate a penalty score for the edge 350 which is indicative of how safe a transition from the first potential state 330 of the vehicle 220 to the second potential state 340 of the vehicle 220 is. To that end, the electronic device 210 may be configured to access the storage 250 in order to retrieve information regarding the safety corridor that the vehicle 220 will have if the vehicle 220 finds itself on the road segment 400 in the second potential state 340 (e.g., at the respective position, and a respective time of the second potential state 340 on the road segment 400).

As such, the electronic device 210 may be configured to use the state data associated with the second potential state 340 (e.g., the respective position, and a respective time of the second potential state 340 on the road segment 400) for accessing the matrix structure 500 stored in the storage 250. Once accessed, the electronic device 210 may be configured to retrieve from the matrix structure 500 the inter-vehicular-distance data stored in a given cell associated with the future position-time pair that best matches the respective position and the respective time of the second potential state 340 on the road segment 400. In other words, the electronic device 210 is accessing the matrix structure 500 in order to determine the distance between the vehicle 220 and a closest neighboring vehicle if the vehicle 220 is located at the respective position and the respective time of the second potential state 340 on the road segment 400. Once this distance is retrieved from the matrix structure 500, the electronic device 210 may be configured to assign a penalty score to the edge 350 based on the so-retrieved distance.

It is contemplated that penalty scores may have an inverse relationship to the so-retrieved distance. In other words, the longer the so-retrieved distance, the smaller the respective penalty score will be, since there is a low risk of collision if the so-retrieved distance is long. Also, the smaller the so-retrieved distance, the larger the respective penalty score will be, since there is a high risk of collision if the so-retrieved distance is short.

However, in some cases, a given edge between two vertices of the graph-structure 300 may be indicative of a transition between two potential states where a first one of the two potential states represents the vehicle 220 being in a first lane and where a second one of the two potential states represent the vehicle being in a second lane. Put another way, in some cases, the edge 350, for example, may indicative of a transition of the vehicle 220 between two lanes (e.g., a lane change). In such cases, the electronic device 210 may be configured to access a first matrix structure in the storage 250 which has been generated for a first reference path in the first lane, and a second matrix structure in the storage 250 which has been generated for a second reference path in the second lane for retrieving inter-vehicular-distance data from both the first matrix structure and the second matrix structure for the purpose of determining and assigning the penalty score to the given edge.

It should be noted that using the index data 380 in combination with the graph-structure 300 is only one non-limiting example of how the electronic device 210 may be configured to use the index data 380 for controlling operation of the vehicle 220. For example, in at least one other embodiment, the index data 380 may be used for the purpose of amending one or more reference paths. In the scenario of FIG. 4, for example, the electronic device 210 may be configured to use the matrix structure 500 for amending the reference path 401. The electronic device 210 may be configured to access the matrix structure 500 in order to retrieve the inter-vehicular distance associated with the vehicle 220 when travelling along the reference path 401 and, based on the distances indicative of the safety corridor for the vehicle 220, the electronic device 210 may be configured to amend positions of the plurality of anchor points 402 along the current lane so as to generate an amended plurality of anchor points that increase, in comparison with the plurality of anchor points 402, the inter-vehicular-distances between the vehicle 220 and the neighbouring vehicle.

Figure 9:
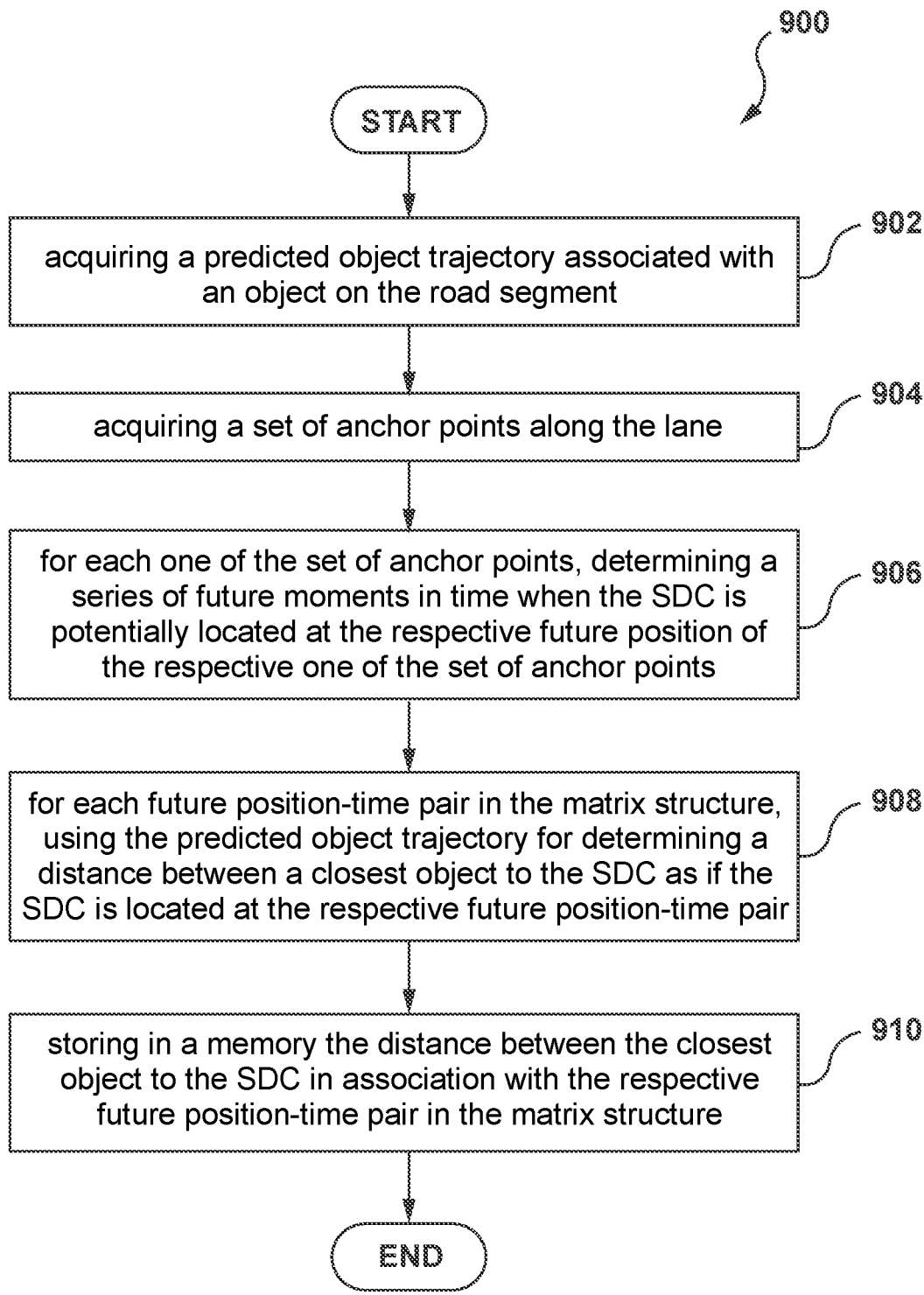
FIG. 9 is a schematic block diagram of a method of generating control data for controlling operation of a Self-Driving Car (SDC), in accordance with at least some embodiments of the present technology.

In some embodiments of the present technology, there is provided a computer-implemented method 900 depicted in FIG. 9 of generating control data for controlling operation of the vehicle 220. In some cases, the vehicle 220 may be implemented as a SDC. The method 900 may be executed while the vehicle 220 is travelling along a road segment having a lane. Various steps of the method 900 will now be described in greater details.

Step 902: Acquiring a Predicted Object Trajectory Associated with an Object on the Road Segment The method 900 begins at step 902 with the electronic device 210 configured to acquire a predicted object trajectory associated with an object on the road segment. For example, the electronic device 210 may be configured to acquire the predicted object trajectory associated with the neighboring vehicle of the vehicle 220 in the scenario of FIG. 4.

The predicted object trajectory is based on the movement data 462 of the neighboring vehicle. It is contemplated that in some embodiments the object may a dynamic object, such as the neighboring vehicle travelling along the road segment 400.

In some embodiments of the present technology, more than one object may be located in proximity to the vehicle 220 on a given road segment. For example, as explained above with respect to the second scenario depicted in FIG. 6, the electronic device 210 may be configured to acquire a respective predicted object trajectory associated with each neighboring vehicle travelling on the road segment 600.

Hence it can be said that the electronic device 210 may be configured to acquire a first given predicted object trajectory associated with a first given neighboring vehicle on a given road segment and a second given predicted object trajectory associated with a second given neighboring vehicle on the given road segment.

In some embodiments, the given road segment may have more than one lane. Also, it is contemplated that the first given object and the second given object are not travelling along the current lane of the vehicle 220 (e.g., travelling in neighboring lanes). For example, the first object may be travelling in a given lane that is on a left side of the lane in which the vehicle 220 is travelling, and wherein the second object is travelling in another given lane that is on a right side of the lane in which the vehicle 220 is travelling (such as in the second scenario of FIG. 6).

Step 904: Acquiring a Set of Anchor Points Along the Lane

The method 900 continues to step 904 with the electronic device 210 configured to acquire a set of anchor points along the lane representative of a given default vehicle path of the vehicle 220 along the lane. For example, with reference to FIG. 4, the electronic device 210 may be configured to acquire the plurality of anchor points 402 representing of the reference path 401 of the vehicle 220 in the current lane of the vehicle 220 on the road segment 400.

It should be noted that a given one of the plurality of anchor points 402 is indicative of a potential future position of the vehicle 220 along the reference path 401. As mentioned above, a given reference path may be located along a center line of the lane.

In some embodiments, where the given road segment has more than one lane, the electronic device 210 may be configured to acquire data about a reference path for a respective lane of the given road segment. For example, if the given road segment has two lanes, the electronic device 210 may be configured to acquire a first plurality of anchor points for a first reference path along a first lane of the given road segment, and a second plurality of anchor points for a second reference path along a second lane of the given road segment.

Step 906: For Each One of the Set of Anchor Points, Determining a Series of Future Moments in Time when the SDC is Potentially Located at the Respective Future Position of the Respective One of the Set of Anchor Points The method 900 continues to step 906 with the electronic device 210 configured to, for each one of the set of anchor points (acquired during the step 904), determine a series of future moments in time when the vehicle 220 is potentially located at the respective future position of the respective one of the set of anchor points, and thereby configured to generate a given matrix structure for the respective reference path. The given matrix structure includes future position-time pairs for the vehicle 220, and where a given future position-time pair is indicative of when and where the vehicle 220 will potentially be located in the future along the respective reference path.

For example, with reference to FIGS. 4 and 5, the electronic device 210 may be configured to determine for the plurality of anchor points 402 the series of future moments in time 550 when the vehicle 220 is potentially located at the respective future positions of the plurality of anchor points 402. The electronic device 210 may thereby be configured to generate the matrix structure 500 for the reference path 401.

It should be noted that the plurality of anchor points 402 and the series of the moments in time 550 used for generating the matrix structure 500 may be at least partially determined by the electronic device 210 employing the matrix-booting information described above.

As it can be seen, the matrix structure 500 includes a respective future position-time pair for a respective cell thereof, and where a given future position-time pair (e.g., a given cell of the matrix structure 500) is indicative of when and where the vehicle 220 will potentially be located in the future along the respective reference path 401.

It should be noted that, in cases where the electronic device 210 acquires more than one plurality/set of anchor points during the step 904, the electronic device 210 may be configured to generate more than one respective matrix structure for a respective reference path.

For example, assuming that the electronic device 210 further acquired a given second plurality of anchor points associated with a second reference path during the step 904, the electronic device 210 may be configured to generate a respective second matrix for the second reference path, similarly to how the electronic device 210 is configured to generate the matrix structure 500 for the reference path 401. This example is illustrated via the third scenario depicted in FIGS. 7 and 8, where the electronic device 210 may be configured to generate the plurality of matrix structures 800 for the reference paths on the road segment 700, namely the first matrix structure 802 for the reference path 701, the second matrix structure 804 for the reference path 721, and the third matrix structure 806 for the reference path 741.

Step 908: For Each Future Position-Time Pair in the Matrix Structure, Using the Predicted Object Trajectory for Determining a Distance Between a Closest Object to the SDC as if the SDC is Located at the Respective Future Position-Time Pair The method 900 continues to step 908 with the electronic device 210 configured to, for each future position-time pair in a given matrix structure, use the predicted object trajectory for determining a distance between a closest object to the vehicle 220 as if the vehicle 220 is located at the respective future position-time pair.

To better illustrate this, let's take the example of the future position-time pair associated with the cell 526 of the matrix structure 500 which corresponds to a pair including (i) the "x" and "y" coordinates of the third anchor point 413 and (ii) the sixth moment in time t6. As such, the electronic device 210 may be configured to compare (i) the future position-time pair including the "x" and "y" coordinates of the third anchor point 413 and the sixth moment in time t6, against (ii) the plurality of estimated neighbour vehicle position-time pairs of the predicted vehicle trajectory of the neighbouring vehicle.

In this case, let it be assumed that one of the plurality of estimated neighbouring vehicle position-time pairs from the predicted vehicle trajectory includes both (i) the sixth moment in time t6, and (ii) the "x" coordinate of the third anchor point 413. This means that, the vehicle 220 and the neighbouring vehicle will find themselves at least partially side-by-side at the moment in time t6 at the "x" coordinate of the third anchor point 413, assuming (i) that the vehicle 220 is located at the coordinates of the third anchor point 413 at the sixth moment in time t6 and (ii) that the neighbouring vehicle will follow the predicted vehicle trajectory.

In such a situation, the electronic device 210 may be configured to determine an inter-vehicular distance (i) between the vehicle 220 and the neighbouring vehicle and (ii) at the future position-time pair associated with the cell 526 (and/or the matching estimated neighbouring vehicle position-time pair of the predicted vehicle trajectory). To that end, the electronic device 210 may be configured to determine a difference between (i) the "y" coordinate of the third anchor point 413 and (ii) the "y" coordinate of the matching estimated neighbouring vehicle position-time pair. The electronic device 210 may then be configured to store the so-determined distance in the cell 526 (e.g., populate the cell 526 with the so-determined distance). In some non-limiting embodiments of the present technology, the inter-vehicular distance may further be associated with an indication of the direction, such as left or right.

It should be noted that in this example, the difference between (i) the "y" coordinate of the third anchor point 413 and (ii) the "y" coordinate of the matching estimated neighbouring vehicle position-time pair is positive. As such, the so-determine distance stored in the cell 536 may also be indicative of that, not only the neighbouring vehicle will be located side-by-side with the vehicle 220, but will be located on the left side of the vehicle 220, while assuming (i) that the vehicle 220 is located at the coordinates of the third anchor point 413 at the sixth moment in time t6 and (ii) that the neighbouring vehicle will follow the predicted vehicle trajectory.

In other embodiments of the present technology, where more than one object is located in proximity to the vehicle 220, such that the electronic device 210 acquires more than one predicted object trajectories during the step 902, the electronic device 210 may also be configured to for each future position-time pair in the given matrix structure, use the predicted object trajectory of the first object and the second predicted object trajectory of the second object for determining a distance between a left-closest object to the vehicle 220 and a right-closest object to the vehicle 220 as if the vehicle 220 is located at the respective future position-time pair.

In some embodiments of the present technology, the step 908 may be performed for each matrix structure that the electronic device 210 generates during the step 906 of the method 900, without departing from the scope of the present technology.

Step 910: Storing in a Memory the Distance Between the Closest Object to the SDC in Association with the Respective Future Position-Time Pair in the Matrix Structure The method 900 continues to step 910 with the electronic device 210 configured to store, in a memory (such as the storage 250, for example), the distance between the closest object to the vehicle 220 in association with the respective future position-time pair in a given matrix structure. The distance stored in the given matrix structure for the respective future position-time pair is representative of a safety corridor for the vehicle 220 if the vehicle 220 is located at the respective future position-time pair.

With reference to FIG. 5 depicting the matrix structure 500, electronic device 210 may be configured to, for each future position-time pair in the matrix structure 500 (e.g., each cell of the matrix structure 500), use the predicted object trajectory (e.g., the plurality of estimated neighbouring vehicle position-time pairs) for determining a distance between the neighboring vehicle and the vehicle 2020 as if the vehicle 220 is located at the respective future position-time pair and as if the neighboring vehicle is travelling in accordance with the predicted object trajectory. It should be noted that the so-determined distance for the respective future position-time pair is representative of a safety corridor for the vehicle 220 if the vehicle 220 is located at the respective future position-time pair. The electronic device 210 may then be configured to store the populated matrix structure 500 with the so-determined distances in the storage 250.

In some embodiments of the present technology, it is contemplated that the electronic device may be configured to store in the memory, the distance between the left-closest neighboring vehicle to the vehicle 220 and the distance between the right-closest neighboring vehicle to the vehicle 220 in association with the respective future position-time pair in a given matrix structure. In this case, as explained above, (i) the distance to the left-closest neighbouring vehicle and (ii) the distance to the right-closest neighbouring vehicle stored in the given matrix structure for the respective future position-time pair is representative of the safety corridor for the vehicle 220 if the vehicle 220 is located at the respective future position-time pair.

In some embodiments of the present technology, the step 910 may be performed for each matrix structure that the electronic device 210 generates during the step 906 of the method 900, without departing from the scope of the present technology.

In some embodiments of the present technology, the method 900 may further comprise additional steps that are performed during an in-use phase of a given matrix structure. For example, the electronic device 210 may be configured to employ index data 380 of FIG. 3, comprising one or more matrix structures, for assigning penalty scores to edges of the graph-structure 300. For example, a given vertex of the graph-structure 300 is associated with vehicle state data representing a potential state of the vehicle 220 on a given road segment. This vehicle state data may include a respective position and a respective moment in time of where and when the vehicle 220 may potentially find itself in the respective state on the given road segment.

The electronic device 210 may be configured to use the vehicle state data associated with that given vertex of the graph-structure 300 for accessing the storage 250 storing the one or more matrix structures (e.g., the index data 380) for retrieving the distance associated with the future position-time pair that best matches the position and the moment in time of the respective state of the vehicle 220. The electronic device 210 may further use the retrieved distance to generate a penalty score for a given edge connected to the given vertex, as explained above, and where the penalty score being indicative of how safe a transition from a previous state of the vehicle 220 to the respective state of the vehicle 220 is.

The electronic device 210 may further be configured to, during the in-use phase of the one or more matrix structures, generate a respective penalty score for each edge of the graph-structure 300, and execute a shortest-path-type algorithm on the graph-structure 300 for determining a series of states of the vehicle 220 that is a most safe series of states on the given road segment. This series of states of the vehicle 220 is connected by a series of target edges having a smallest cumulative penalty score. The electronic device 210 may then use the vehicle state data of this series of states for generating the control data for controlling operation of the vehicle 220 along the road segment, and then may trigger operation of the vehicle 220 on the road segment in accordance with the control data.

It should be noted that when a given edge of the graph-structure 300 is associated with a transition between two lanes, the electronic device 210 may be configured access two matrix structures in the index data 380, the first one of the two matrix structures being generated for a first reference path in a first one of the two lanes, and the second one of the two matrix structures being generated for a second reference path in a second one of the two lanes.

However, the electronic device 210 may employ the index data 380 during its in-use phase for other purposes than assigning penalty scores to edges in the graph-structure 300. For example, as explained above, the index data 380 may be used by the electronic device 210 in order to amend one or more reference paths along the road segment such that the amended reference path has amended anchor points which are selected, based on the index data 380 so as to increase inter-vehicular distance between the vehicle 220 and other objects along the road, in comparison to the respective reference paths. The vehicle 220 following a given so-amended reference path, instead of the respective reference path, may allow reducing the risk of collision with other objects if the vehicle 220 in comparison to the risk of collision if the vehicle 220 follows the respective reference path.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of generating control data for controlling operation of a Self-Driving Car (SDC), the SDC travelling on a road segment, the road segment having a lane, the method executable by an electronic device coupled with the SDC, the method comprising:
acquiring, by the electronic device, a predicted object trajectory associated with an object on the road segment,
the predicted object trajectory being based on movement data of the object;
acquiring, by the electronic device, a set of anchor points along the lane,
the set of anchor points being representative of a default vehicle path of the SDC along the lane,
each one of the set of anchor points being indicative of a potential future position of the SDC along the default vehicle path;
for each one of the set of anchor points,
determining, by the electronic device, a series of future moments in time when the SDC is potentially located at a respective future position of a respective one of the set of anchor points,
thereby generating a matrix structure including future position-time pairs for the SDC,
a given future position-time pair being indicative of when and where the SDC will potentially be located in the future along the default vehicle path;
for each future position-time pair in the matrix structure,
using, by the electronic device, the predicted object trajectory for determining a distance between a closest object to the SDC as if the SDC is located at the respective future position-time pair;
storing, by the electronic device in a memory, the distance between the closest object to the SDC in association with the respective future position-time pair in the matrix structure,
the distance stored in the matrix structure for the respective future position-time pair being representative of a safety corridor for the SDC if the SDC is located at the respective future position-time pair,
wherein the method further comprises, during an in-use phase of the matrix structure:
acquiring, by the electronic device, SDC state data associated with vertices in a graph-structure,
the vertices being connected by edges in the graph-structure,
a given vertex defining a respective state of the SDC on the road segment,
a given state of the SDC representing at least a respective position of the SDC on the road segment at a respective moment in time,
a given edge defining a transition between a respective pair of states of the SDC on the road segment;
using, by the electronic device, the SDC state data of the given vertex for retrieving, from the memory storing the matrix structure,
the distance associated with the future position-time pair that best matches the position and the moment in time of the respective state of the SDC; and
using, by the electronic device, the retrieved distance to generate a penalty score for the given edge connected to the given vertex,
the penalty score being indicative of how safe a transition from a previous state of the SDC to the respective state of the SDC is.

2. The method of claim 1, wherein the default vehicle path is located along a center line of the lane.

3. The method of claim 1, wherein the method further comprises, during the in-use phase of the matrix structure:
generating, by the electronic device, a respective penalty score for each edge of the graph-structure;
executing, by the electronic device, a shortest-path-type algorithm for determining a series of target states of the SDC that is a most safe series of states on the road segment along the lane,
the series of target states of the SDC being connected by a series of target edges,
the series of target edges having a smallest cumulative penalty score; and
using, by the electronic device, the SDC state data of the series of target states for generating the control data for controlling operation of the SDC; and
triggering, by the electronic device, operation of the SDC on the road segment in accordance with the control data.

4. The method of claim 1, wherein the method further comprises:
acquiring, by the electronic device, a second predicted object trajectory associated with a second object on the road segment,
the second predicted object trajectory being based on movement data of the second object on the road segment; and wherein
the using the predicted object trajectory for each future position-time pair further comprises:
for each future position-time pair in the matrix structure,
using, by the electronic device, the predicted object trajectory and the second predicted object trajectory for determining a distance between a left-closest object to the SDC and a right-closest object to the SDC as if the SDC is located at the respective future position-time pair; and wherein
the storing the distance in the memory further comprises:
storing, by the electronic device in the memory, the distance between the left-closest object to the SDC and the distance between the right-closest object to the SDC in association with the respective future position-time pair in the matrix structure,
(i) the distance to the left-closest object and (ii) the distance to the right-closest object stored in the matrix structure for the respective future position-time pair being representative of the safety corridor for the SDC if the SDC is located at the respective future position-time pair.

5. The method of claim 4, wherein the road segment has more than one lane, and wherein the object and the second object are not travelling along a same lane as the SDC.

6. The method of claim 4, wherein the road segment has more than one lane, and wherein the object is travelling in a given lane that is on a left side of the lane in which the SDC is travelling, and wherein the second object is travelling in another given lane that is on a right side of the lane in which the SDC is travelling.

7. The method of claim 1, wherein the road segment has a second lane, and wherein the method further comprises:

acquiring, by the electronic device, a second set of anchor points along the second lane,
the second set of anchor points being representative of a second default vehicle path of the SDC along the second lane,
each one of the second set of anchor points being indicative of a potential future position of the SDC along the second default vehicle path;
for each one of the second set of anchor points,
determining, by the electronic device, a series of future moments in time when the SDC is potentially located at a respective future position of a respective one of the second set of anchor points,
thereby generating a second matrix structure including second future position-time pairs for the SDC, a given second future position-time pair being indicative of when and where the SDC will potentially be located in the future along the second lane;
for each second future position-time pair in the second matrix structure,
using, by the electronic device, the predicted object trajectory for determining a second distance between a second closest object to the SDC as if the SDC is located at the respective second future position-time pair;
storing, by the electronic device in the memory, the second distance between the second closest object to the SDC in association with the respective second future position-time pair in the second matrix structure, the second distance stored in the second matrix structure for the respective second future position-time pair being representative of the safety corridor for the SDC if the SDC is located at the respective second future position-time pair.

8. The method of claim 7, wherein the method further comprises, during an in-use phase of the matrix structure and of the second matrix structure:
using, by the electronic device, the SDC state data of the given vertex for retrieving, from the memory storing (i) the respective future position-time pairs in the matrix structure, and (ii) the respective second future position-time pairs in the second matrix structure,
one of (i) the distance associated with the future position-time pair and (ii) the second distance associated with the second future position-time pair that best matches the position and the moment in time of the respective state of the SDC; and
using, by the electronic device, the retrieved distance to generate a penalty score for the given edge connected to the given vertex,
the penalty score being indicative of how safe a transition from a previous state of the SDC to the respective state of the SDC is.

9. The method of claim 8, wherein if the given edge is indicative of a transition of the SDC between two lanes, the method further comprises accessing both the matrix structure and the second matrix structure.

10. The method of claim 7, wherein the first matrix structure and the second matrix structure is based on at least partially different information about a plurality of other objects on the road segment.

11. The method of claim 1, wherein the object is a dynamic object.

12. A computer-implemented method of generating control data for controlling operation of a Self-Driving Car (SDC), the SDC travelling on a road segment, the road segment having a lane, the method executable by an electronic device coupled with the SDC, the method comprising:
acquiring, by the electronic device, a predicted object trajectory associated with an object on the road segment,
the predicted object trajectory being based on movement data of the object;
acquiring, by the electronic device, a set of anchor points along the lane on which the SDC is travelling,
the set of anchor points being representative of a default vehicle path of the SDC along the lane,
each one of the set of anchor points being indicative of a potential future position of the SDC along the default vehicle path;
determining, by the electronic device, a series of future moments in time when the SDC is potentially located at a respective future position of a respective one of the set of anchor points,
generating a matrix structure including a plurality of future position-time pairs for the SDC,
a given future position-time pair being indicative of when and where the SDC will potentially be located in the future along the default vehicle path;
for each future position-time pair in the matrix structure,
using, by the electronic device, the predicted object trajectory for determining a distance between a closest object to the SDC as if the SDC is located at the respective future position-time pair;
storing, by the electronic device in a memory, the distance between the closest object to the SDC in association with the respective future position-time pair in the matrix structure,
the distance stored in the matrix structure for the respective future position-time pair being representative of a safety corridor for the SDC if the SDC is located at the respective future position-time pair,
wherein the method further comprises, during an in-use phase of the matrix structure:
acquiring, by the electronic device, SDC state data associated with vertices in a graph-structure,
the vertices being connected by edges in the graph-structure,
a given vertex defining a respective state of the SDC on the road segment,
a given state of the SDC representing at least a respective position of the SDC on the road segment at a respective moment in time,
a given edge defining a transition between a respective pair of states of the SDC on the road segment:
using, by the electronic device, the SDC state data of the given vertex for retrieving, from the memory storing the matrix structure,
the distance associated with the future position-time pair that best matches the position and the moment in time of the respective state of the SDC; and
using, by the electronic device, the retrieved distance to generate a penalty score for the given edge connected to the given vertex,
the penalty score being indicative of how safe a transition from a previous state of the SDC to the respective state of the SDC is.

13. A computer-implemented method of generating control data for controlling operation of a Self-Driving Car (SDC), the SDC travelling on a road segment, the road segment having a lane, the method executable by an electronic device coupled with the SDC, the method comprising:

acquiring, by the electronic device, a predicted object trajectory associated with an object on the road segment,
the predicted object trajectory being based on movement data of the object on the road segment;
generating a matrix structure including a plurality of future position-time pairs for the SDC,
a given future position-time pair being indicative of when and where the SDC will potentially be located in the future along a default vehicle path;
for each future position-time pair in the matrix structure,
using, by the electronic device, the predicted object trajectory for determining a distance between a closest object to the SDC as if the SDC is located at the respective future position-time pair;
storing, by the electronic device in a memory, the distance between the closest object to the SDC in association with the respective future position-time pair in the matrix structure,
the distance stored in the matrix structure for the respective future position-time pair being representative of a safety corridor for the SDC if the SDC is located at the respective future position-time pair,
wherein the method further comprises, during an in-use phase of the matrix structure:
acquiring, by the electronic device, SDC state data associated with vertices in a graph-structure,
the vertices being connected by edges in the graph-structure,
a given vertex defining a respective state of the SDC on the road segment,
a given state of the SDC representing at least a respective position of the SDC on the road segment at a respective moment in time,
a given edge defining a transition between a respective pair of states of the SDC on the road segment:
using, by the electronic device, the SDC state data of the given vertex for retrieving, from the memory storing the matrix structure,
the distance associated with the future position-time pair that best matches the position and the moment in time of the respective state of the SDC; and
using, by the electronic device, the retrieved distance to generate a penalty score for the given edge connected to the given vertex,
the penalty score being indicative of how safe a transition from a previous state of the SDC to the respective state of the SDC is.

14. The method of claim 13, wherein the generating the matrix structure comprises:
acquiring, by the electronic device, a set of anchor points along the lane on which the SDC is travelling,
the set of anchor points being representative of the default vehicle path of the SDC along the lane,
each one of the set of anchor points being indicative of a potential future position of the SDC along the default vehicle path;
determining, by the electronic device, a series of future moments in time when the SDC is potentially located at a respective future position of a respective one of the set of anchor points.

15. An electronic device for generating control data for controlling operation of a Self-Driving Car (SDC), the SDC travelling on a road segment, the road segment having a lane, the electronic device coupled with the SDC, the electronic device being configured to:
acquire a predicted object trajectory associated with an object on the road segment,
the predicted object trajectory being based on movement data of the object;
acquire a set of anchor points along the lane,
the set of anchor points being representative of a default vehicle path of the SDC along the lane,
each one of the set of anchor points being indicative of a potential future position of the SDC along the default vehicle path;
for each one of the set of anchor points,
determine a series of future moments in time when the SDC is potentially located at a respective future position of a respective one of the set of anchor points,
thereby generate a matrix structure including future position-time pairs for the SDC,
a given future position-time pair being indicative of when and where the SDC will potentially be located in the future along the default vehicle path;
for each future position-time pair in the matrix structure,
use the predicted object trajectory for determining a distance between a closest object to the SDC as if the SDC is located at the respective future position-time pair;
store, in a memory, the distance between the closest object to the SDC in association with the respective future position-time pair in the matrix structure,
the distance stored in the matrix structure for the respective future position-time pair being representative of a safety corridor for the SDC if the SDC is located at the respective future position-time pair,
wherein the electronic device is further configured to, during an in-use phase of the matrix structure:
acquire SDC state data associated with vertices in a graph-structure,
the vertices being connected by edges in the graph-structure,
a given vertex defining a respective state of the SDC on the road segment,
a given state of the SDC representing at least a respective position of the SDC on the road segment at a respective moment in time,
a given edge defining a transition between a respective pair of states of the SDC on the road segment:
use the SDC state data of the given vertex for retrieving, from the memory storing the matrix structure,
the distance associated with the future position-time pair that best matches the position and the moment in time of the respective state of the SDC; and
use the retrieved distance to generate a penalty score for the given edge connected to the given vertex,
the penalty score being indicative of how safe a transition from a previous state of the SDC to the respective state of the SDC is.

16. The electronic device of claim 15, wherein the default vehicle path is located along a center line of the lane.

17. The electronic device of claim 15, wherein the electronic device is further configured to, during the in-use phase of the matrix structure:
generate a respective penalty score for each edge of the graph-structure;
execute a shortest-path-type algorithm for determining a series of target states of the SDC that is a most safe series of states on the road segment along the lane, the series of target states of the SDC being connected by a series of target edges,
the series of target edges having a smallest cumulative penalty score; and
use the SDC state data of the series of target states for generating the control data for controlling operation of the SDC; and
trigger operation of the SDC on the road segment in accordance with the control data.

18. The electronic device of claim 15, wherein the electronic device is further configured to:
acquire a second predicted object trajectory associated with a second object on the road segment,
the second predicted object trajectory being based on movement data of the second object on the road segment; and wherein
to use the predicted object trajectory for each future position-time pair further comprises the electronic device configured to:
for each future position-time pair in the matrix structure,
use the predicted object trajectory and the second predicted object trajectory for determining a distance between a left-closest object to the SDC and a right-closest object to the SDC as if the SDC is located at the respective future position-time pair; and wherein
to store the distance in the memory further comprises the electronic device configured to:
store, in the memory, the distance between the left-closest object to the SDC and the distance between the right-closest object to the SDC in association with the respective future position-time pair in the matrix structure,
(i) the distance to the left-closest object and (ii) the distance to the right-closest object stored in the matrix structure for the respective future position-time pair being representative of the safety corridor for the SDC if the SDC is located at the respective future position-time pair.

* * * * *